(12) United States Patent
Chien

(10) Patent No.: US 11,137,121 B2
(45) Date of Patent: Oct. 5, 2021

(54) USB DEVICE HAS SEPARATED DISTANCE AWAY USB-UNIT(S) BY BRANCH-WIRE(S)

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 16/713,435

(22) Filed: Dec. 13, 2019

(65) Prior Publication Data
US 2020/0191345 A1  Jun. 18, 2020

Related U.S. Application Data

(60) Continuation-in-part of application No. 14/951,872, filed on Nov. 25, 2015, now Pat. No. 10,948,175, (Continued)

(51) Int. Cl.
*F21S 8/00* (2006.01)
*G02F 1/13* (2006.01)
(Continued)

(52) U.S. Cl.
CPC ............. *F21S 8/035* (2013.01); *F21S 9/02* (2013.01); *F21S 10/007* (2013.01); *F21V 5/04* (2013.01);
(Continued)

(58) Field of Classification Search
CPC . F21S 8/035; F21S 9/02; F21S 10/007; F21V 5/04; F21V 13/02; F21V 14/003;
(Continued)

(56) References Cited

U.S. PATENT DOCUMENTS

| | | | |
|---|---|---|---|
| 6,445,087 B1* | 9/2002 | Wang | H04B 3/54 307/40 |
| 6,780,048 B2* | 8/2004 | Chen | H01R 13/7034 439/502 |

(Continued)

*Primary Examiner* — Bao Q Truong
(74) *Attorney, Agent, or Firm* — Bacon & Thomas, PLLC

(57) ABSTRACT

A desktop USB device has power-wire(s) or storage-wire arrangement. The device has more than one separated distance away USB-Unit(s) by branch-wire(s) and have wire storage arrangement for at least one of an USB jump-wire, an AC power-wire, USB-charger wire or another charging related wire(s). The USB device and separated USB-Unit(s) to be installed on a desktop or floor at a hand-reachable distance from people, and install or attach anywhere by attachment so that there is no need for people to bend body or knee to get the USB-port(s) to charge i-phone or Tablet(s). The current invention use shortest #14 gauge AC wire for power strips and use long length of #18 gauge to supply DC power to USB ports built-in separated USB-unit(s) the charger. The USB-charger power-wire arrangement has by at least one main-wire and plurality of branch-wire(s) to connect with at least one of separated and distance away USB-Unit(s) incorporated with external USB-wire has at least 2 ends with male USB-plug to connect with each unit has at least one of female receiving USB-port(s) inside USB Unit(s), that can supply a desired output-current in the range of from 1.0 A to 50 A and at USB needed VDC by converting input AC power ranging from 110 VAC to 250 VAC. The USB device or power station may also optional to incorporate with at least one additional device such as at least one of (i) AC outlet, (2) sensor(s), (3) motion sensor, (4) remote controller, (5) time display, (6) LEDs, (7) IC, (8) 2nd LED(s) (9) Detecor for charging status and system, (10) power fail device, (11) diffusor equipment, (12) color changing, color selection, function selection for LED(s) light illumination. (13) other lights, (14) a power fail device, (15) a smell device, an (16) audio device, a video device.

8 Claims, 14 Drawing Sheets

Related U.S. Application Data which is a continuation-in-part of application No. 14/829,213, filed on Aug. 18, 2015, now abandoned, which is a division of application No. 13/295,562, filed on Nov. 14, 2011, now Pat. No. 10,066,798, which is a continuation-in-part of application No. 12/622,000, filed on Nov. 19, 2009, now Pat. No. 8,434,927, said application No. 14/829,213 is a continuation-in-part of application No. 14/604,204, filed on Jan. 23, 2015, now Pat. No. 9,196,756, which is a continuation of application No. 13/534,281, filed on Jun. 27, 2012, now Pat. No. 8,960,988, which is a continuation of application No. 12/710,561, filed on Feb. 23, 2010, now Pat. No. 8,303,158, application No. 16/713,435, which is a continuation-in-part of application No. 14/870,601, filed on Sep. 30, 2015, now Pat. No. 10,753,598, which is a continuation-in-part of application No. 14/643,026, filed on Mar. 10, 2015, which is a continuation of application No. 14/144,703, filed on Dec. 31, 2013, which is a continuation of application No. 13/161,643, filed on Jun. 16, 2011, now Pat. No. 8,783,936, application No. 16/713,435, which is a continuation-in-part of application No. 13/117,227, filed on May 27, 2011, now abandoned, and a continuation-in-part of application No. 13/858,604, filed on Apr. 8, 2013, now abandoned, and a continuation-in-part of application No. 14/875,675, filed on Oct. 5, 2015, now abandoned, which is a continuation-in-part of application No. 13/870,253, filed on Apr. 25, 2013, now Pat. No. 9,559,472, application No. 16/713,435, which is a continuation-in-part of application No. 13/863,073, filed on Apr. 15, 2013, now abandoned, and a continuation-in-part of application No. 14/858,538, filed on Sep. 18, 2015, now Pat. No. 10,184,649, which is a continuation-in-part of application No. 14/793,262, filed on Jul. 7, 2015, now abandoned, which is a continuation of application No. 14/642,169, filed on Mar. 9, 2015, now abandoned, which is a continuation of application No. 12/950,017, filed on Nov. 19, 2010, now Pat. No. 8,998,462, application No. 16/713,435, which is a continuation-in-part of application No. 14/466,196, filed on Aug. 22, 2014, now abandoned.

(51) Int. Cl.

| | | |
|---|---|---|
| *F21V 33/00* | (2006.01) | |
| *F21V 23/00* | (2015.01) | |
| *F21V 14/06* | (2006.01) | |
| *F21V 14/00* | (2018.01) | |
| *F21V 13/02* | (2006.01) | |
| *F21V 5/04* | (2006.01) | |
| *F21V 14/08* | (2006.01) | |
| *F21S 10/00* | (2006.01) | |
| *G03B 23/00* | (2006.01) | |
| *F21V 17/02* | (2006.01) | |
| *F21V 21/22* | (2006.01) | |
| *F21V 21/14* | (2006.01) | |
| *F21S 9/02* | (2006.01) | |
| *F21V 29/00* | (2015.01) | |
| *G03B 21/20* | (2006.01) | |
| *F21Y 115/10* | (2016.01) | |
| *F21Y 101/00* | (2016.01) | |
| *F21W 121/00* | (2006.01) | |
| *F21V 23/04* | (2006.01) | |
| *F21V 21/30* | (2006.01) | |

(52) U.S. Cl.
CPC ............ *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/14* (2013.01); *F21V 21/22* (2013.01); *F21V 23/00* (2013.01); *F21V 29/00* (2013.01); *F21V 33/0052* (2013.01); *G02F 1/1313* (2013.01); *G03B 21/2046* (2013.01); *G03B 23/00* (2013.01); *F21V 21/30* (2013.01); *F21V 23/0471* (2013.01); *F21W 2121/00* (2013.01); *F21Y 2101/00* (2013.01); *F21Y 2115/10* (2016.08); *Y10S 362/80* (2013.01); *Y10S 362/806* (2013.01)

(58) Field of Classification Search
CPC ........ F21V 14/006; F21V 14/06; F21V 14/08; F21V 17/02; F21V 21/14; F21V 21/22; F21V 23/00; F21V 29/00; F21V 33/0052; F21V 21/30; F21V 23/0471; G02F 1/1313; G03B 21/2046; G03B 23/00; F21Y 2115/10; F21Y 2101/00; F21W 2121/00; Y10S 362/80; Y10S 362/806
See application file for complete search history.

(56) References Cited

U.S. PATENT DOCUMENTS

| | | |
|---|---|---|
| 7,706,136 B1 | 4/2010 | Dotson et al. |
| 7,918,685 B1 | 4/2011 | Kruckenberg |
| 2003/0103304 A1* | 6/2003 | Rendic, V ............... G06F 1/266 361/90 |
| 2004/0058649 A1 | 3/2004 | Grady |
| 2004/0203275 A1 | 10/2004 | Jeansonne et al. |
| 2005/0088834 A1 | 4/2005 | Milan |
| 2005/0098510 A1 | 5/2005 | Lom |
| 2006/0072271 A1 | 4/2006 | Jones et al. |
| 2006/0261712 A1 | 11/2006 | Henriott et al. |
| 2007/0278996 A1 | 12/2007 | So |
| 2010/0060081 A1 | 3/2010 | Cheong et al. |
| 2011/0084660 A1 | 4/2011 | McSweyn |
| 2011/0215759 A1 | 9/2011 | Lee et al. |

\* cited by examiner add-on or built-in

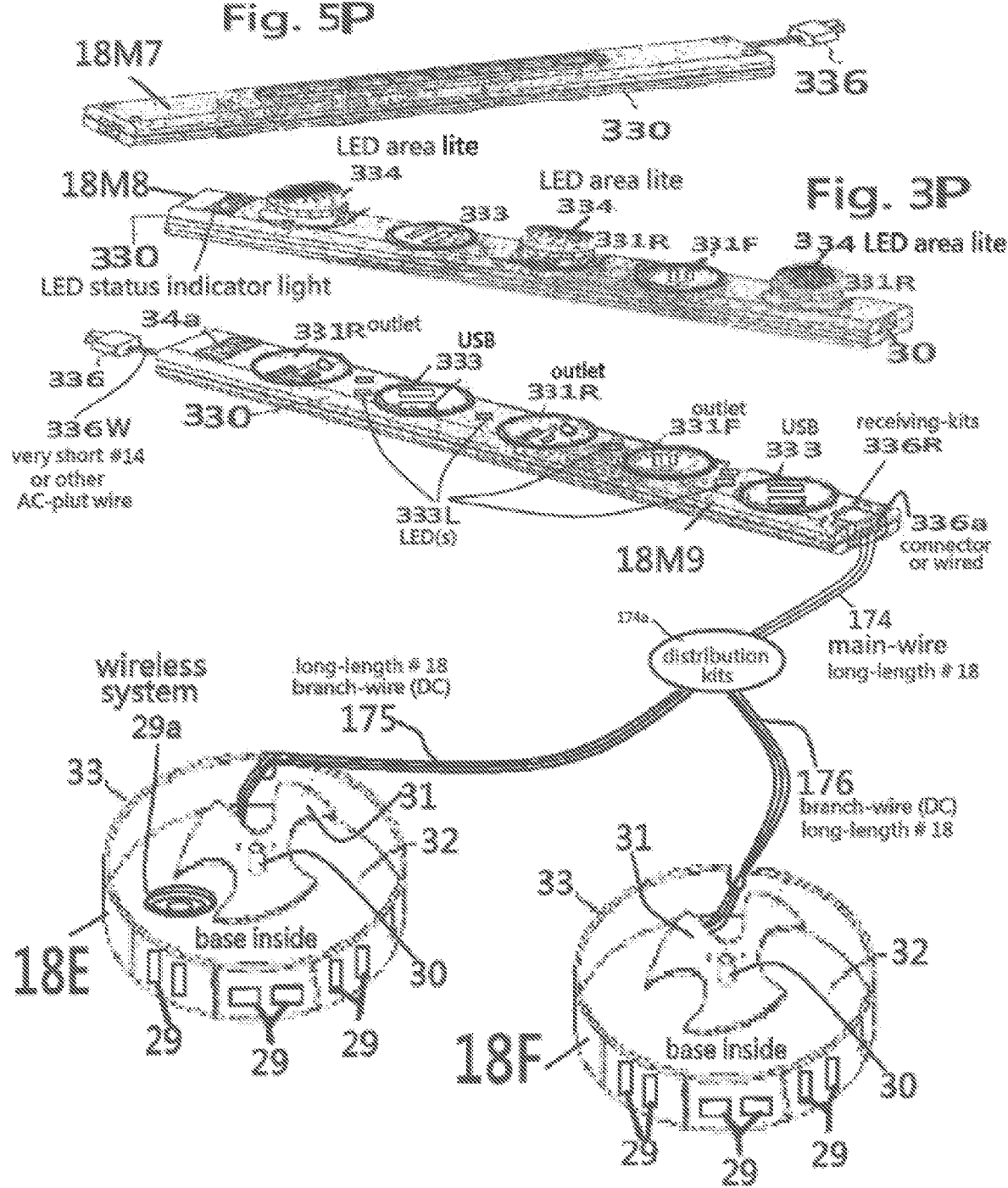

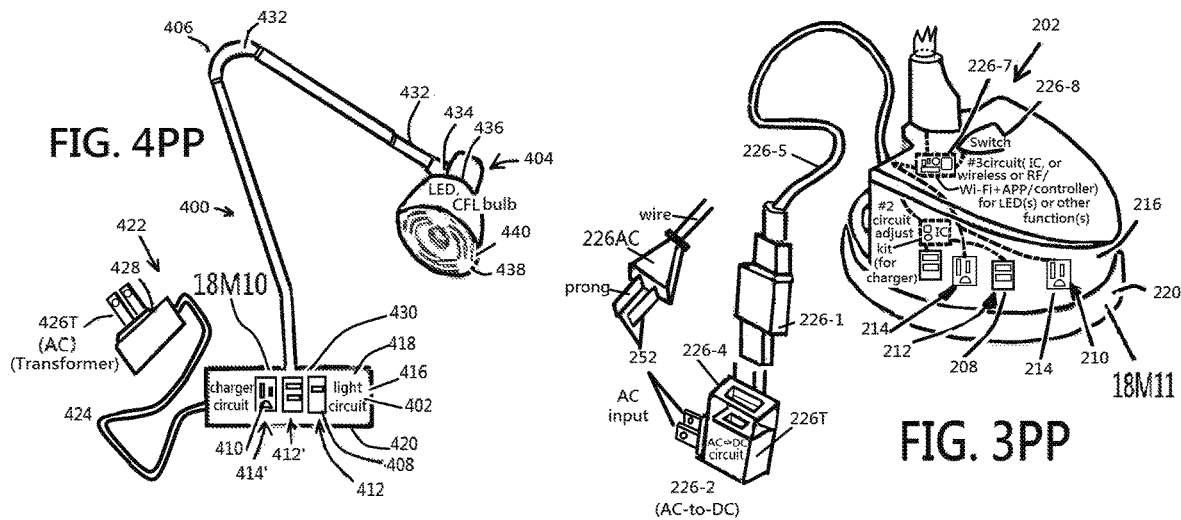
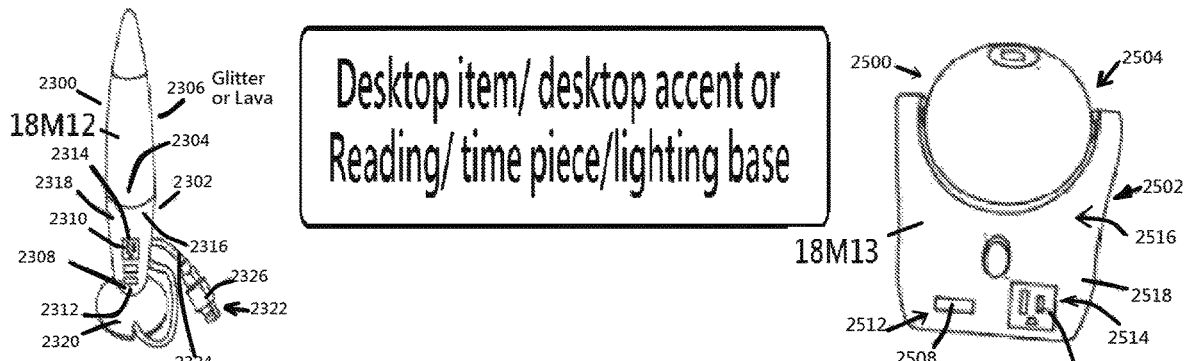
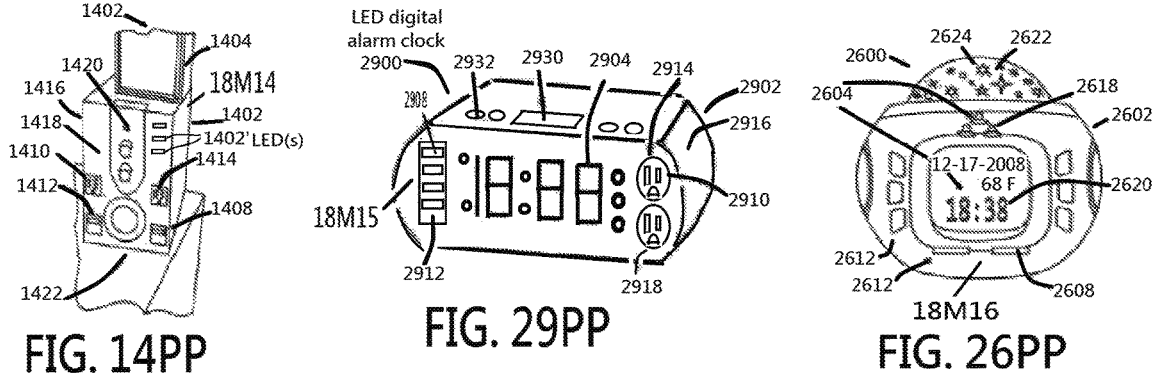

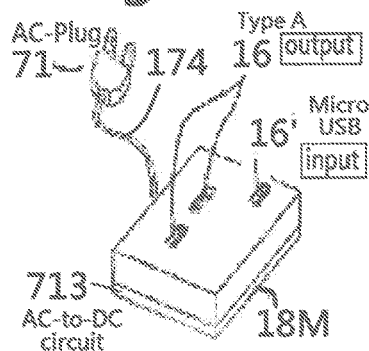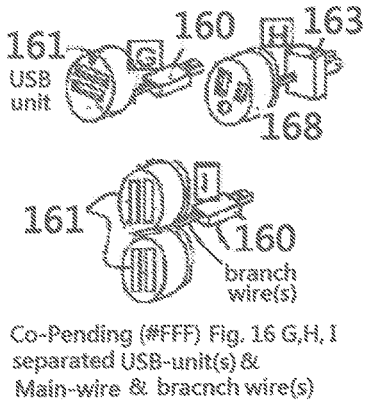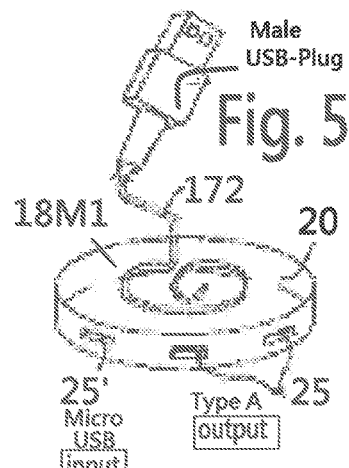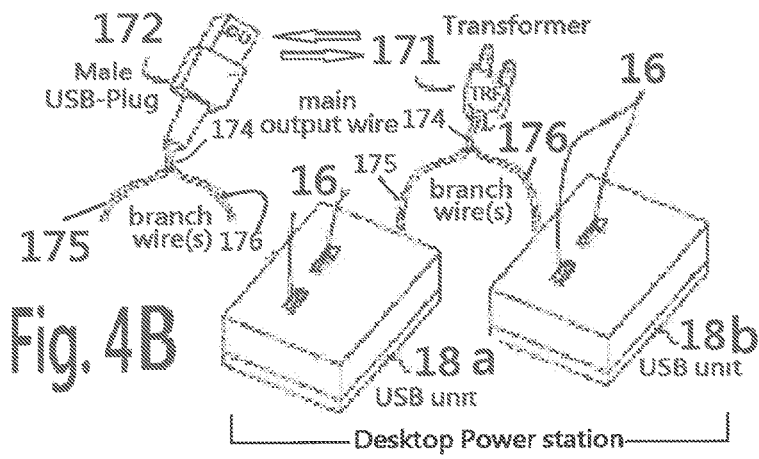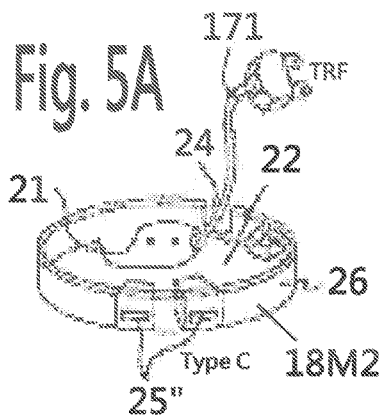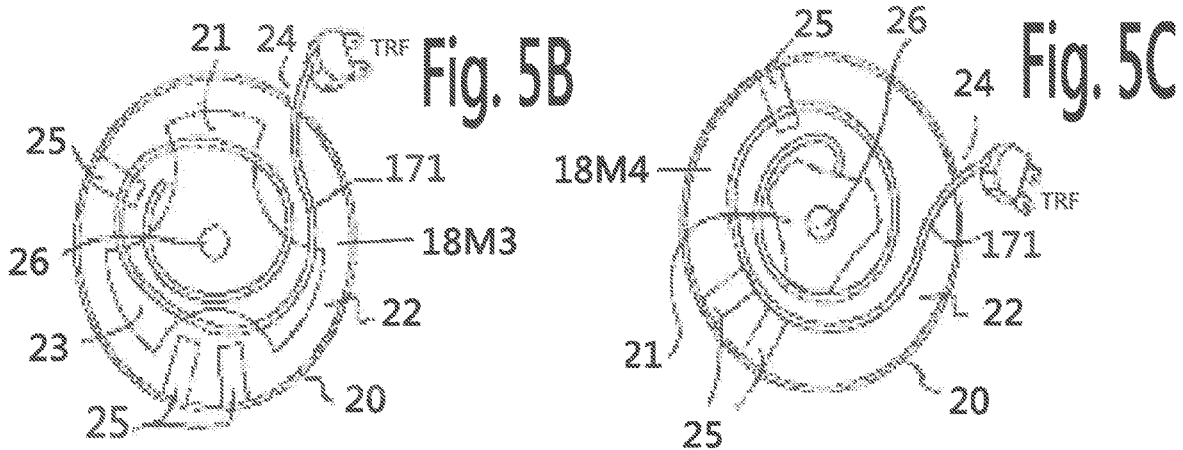

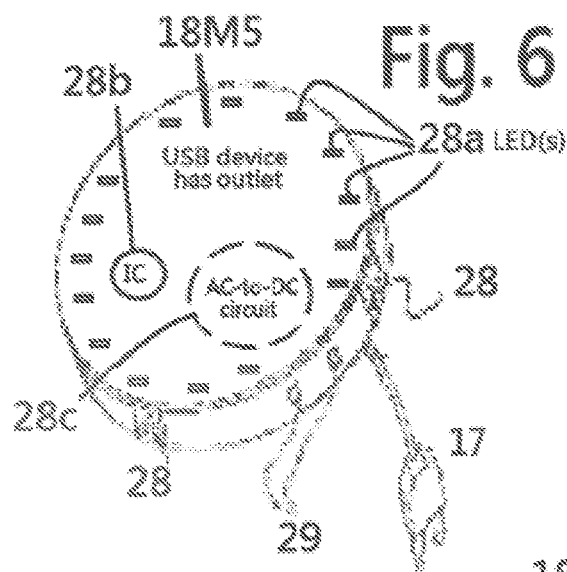
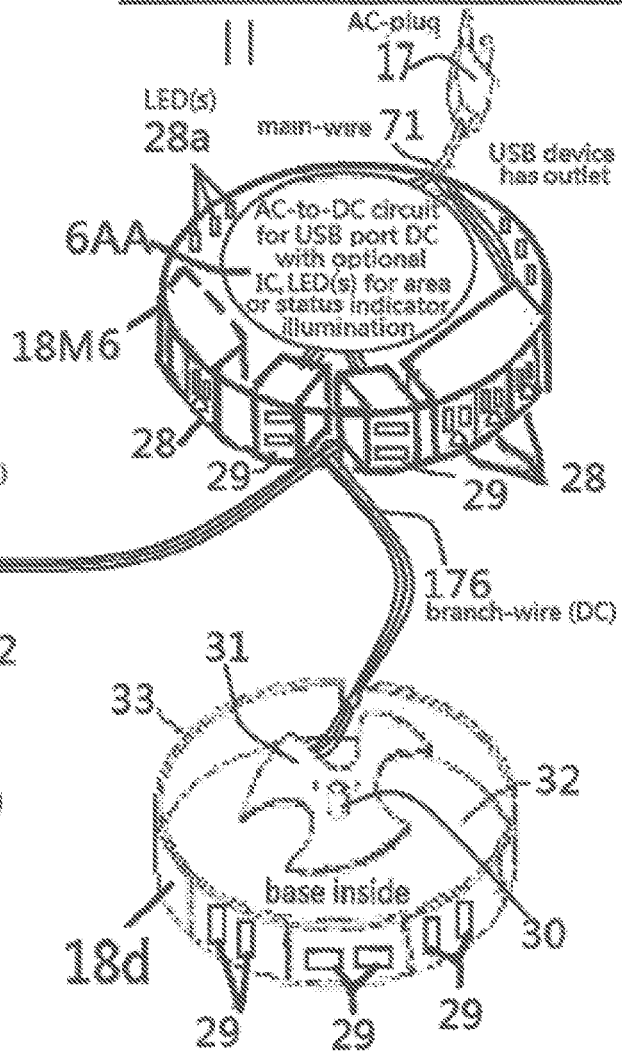
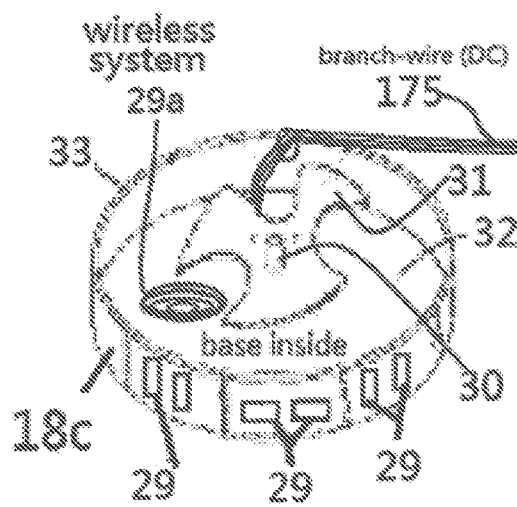
Fig. 6
Fig. 6A

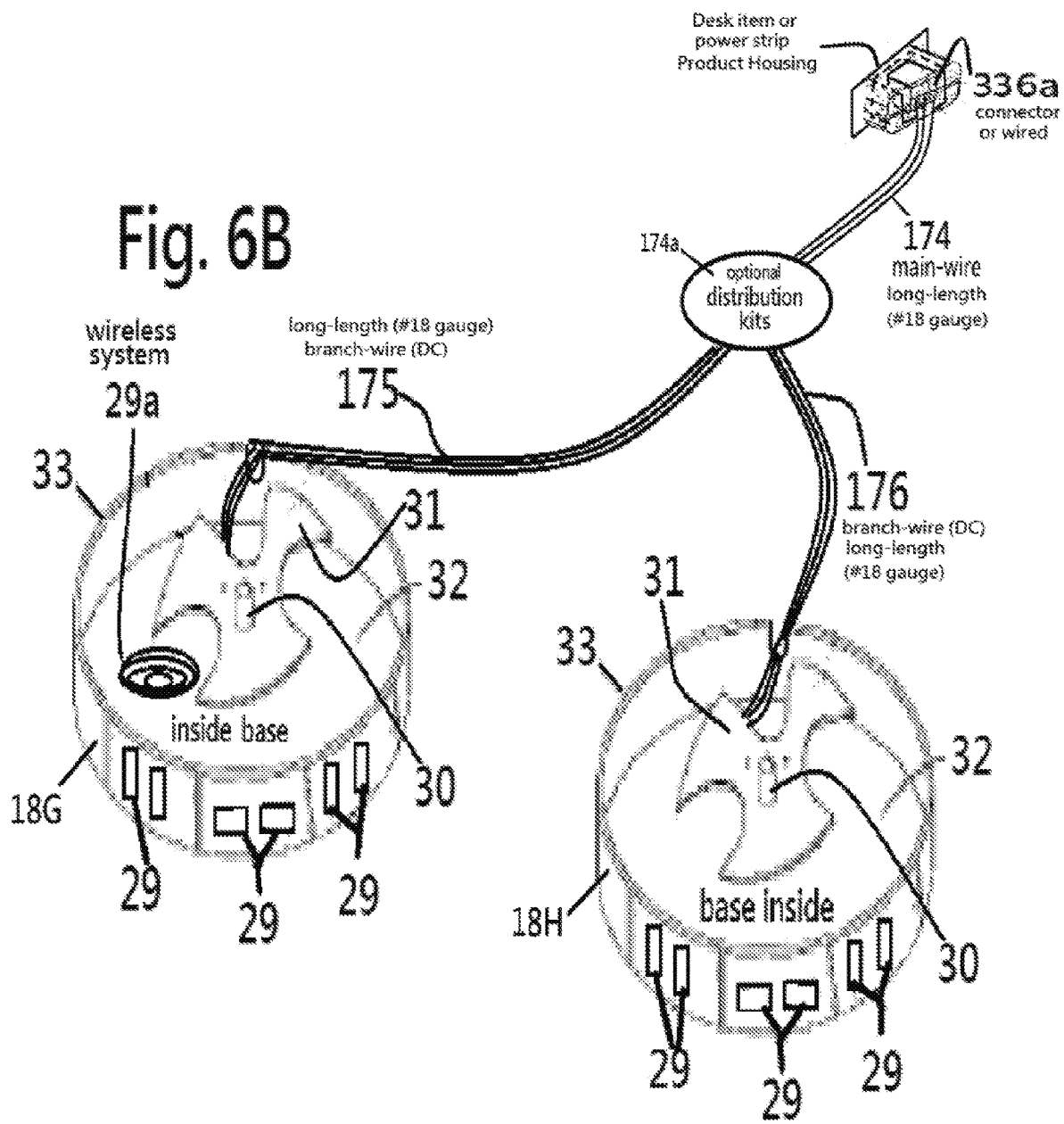

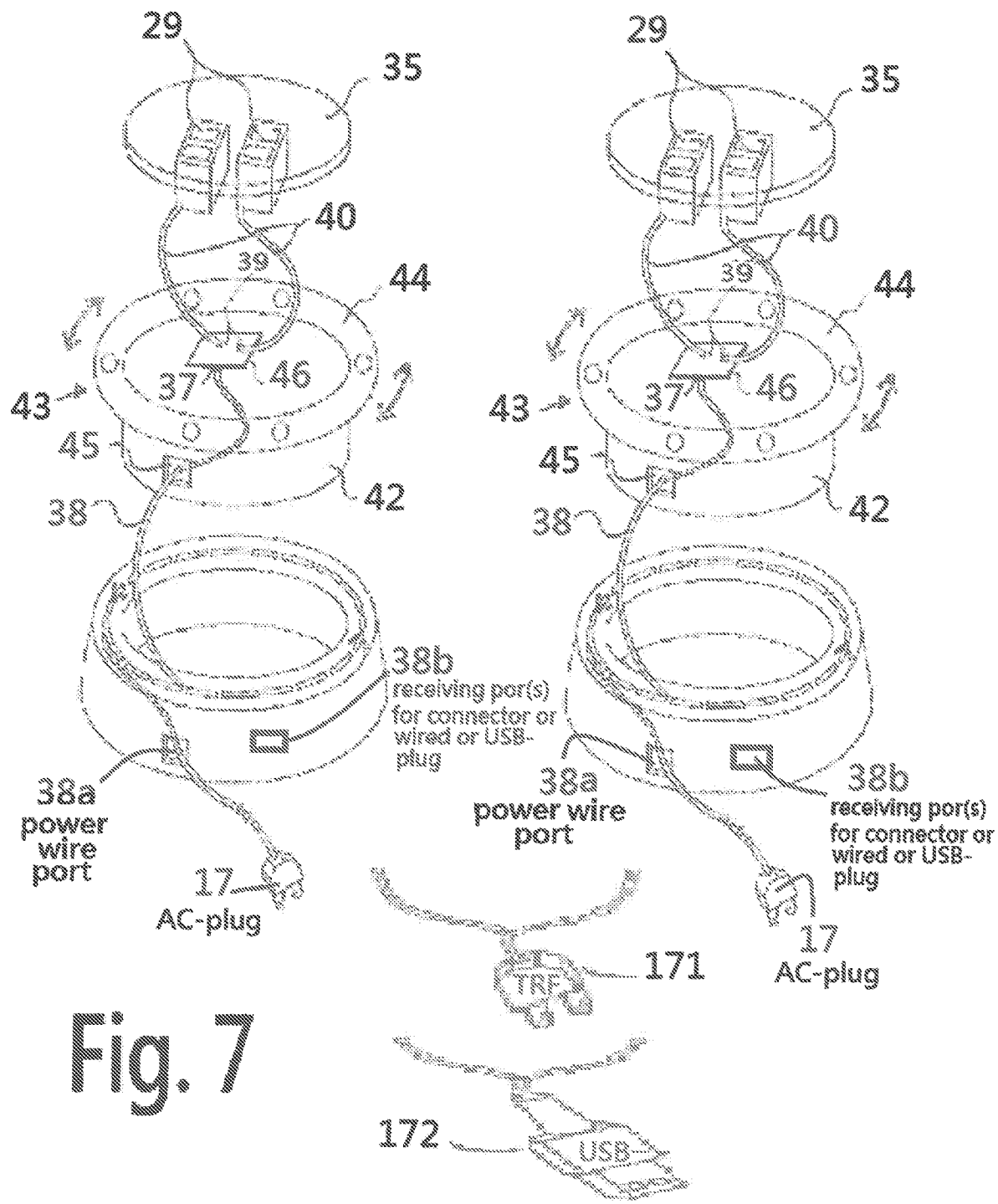

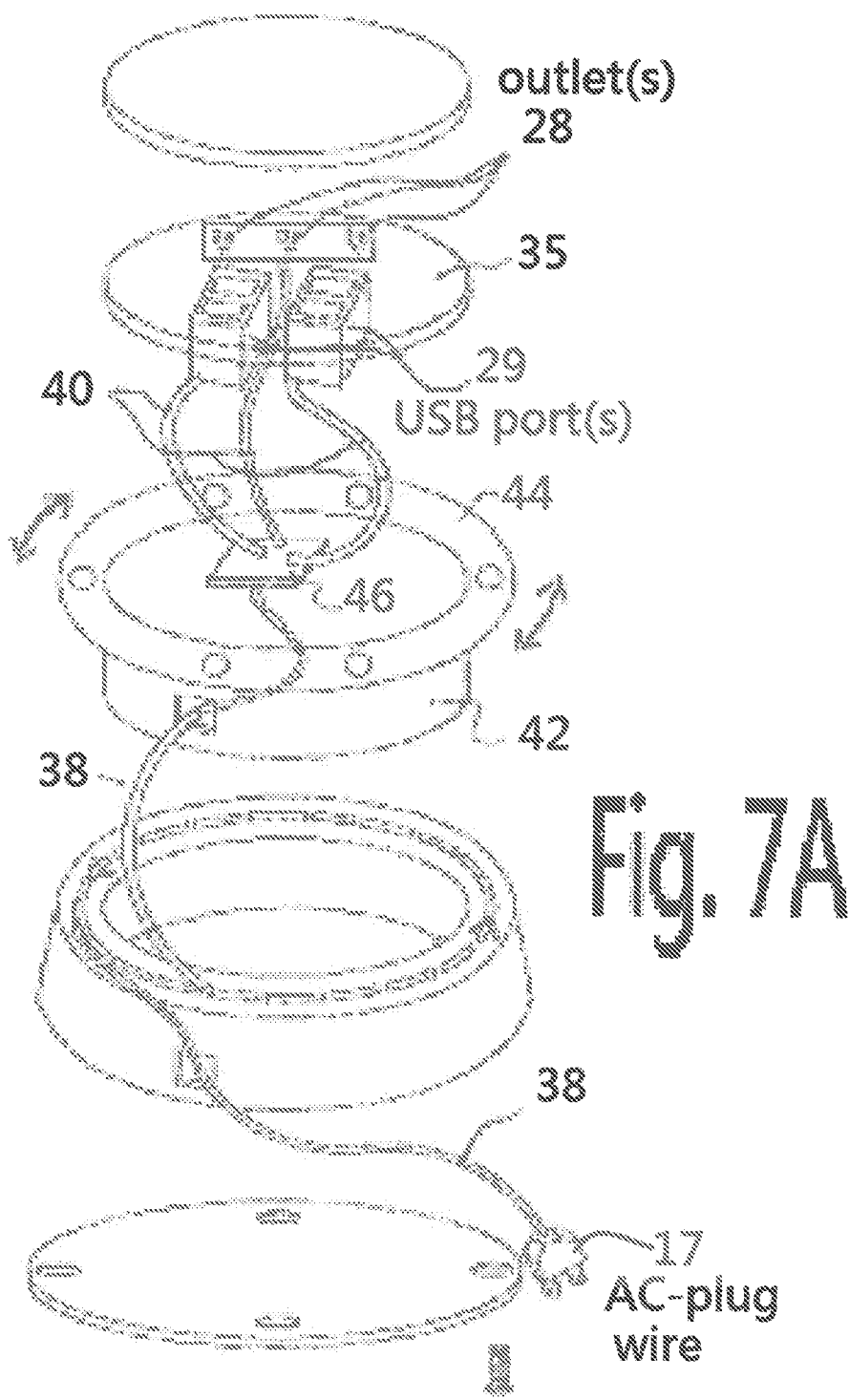

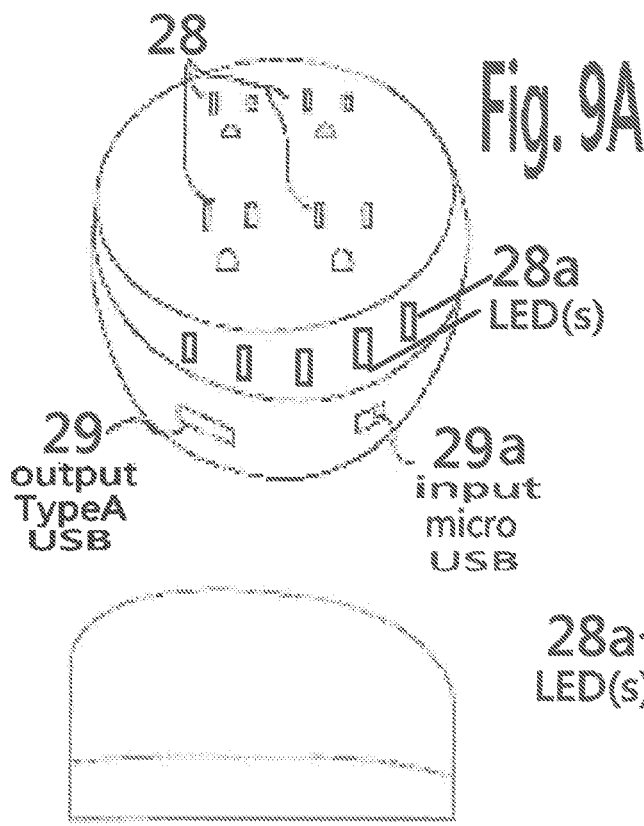
Fig. 9A
Fig. 9B
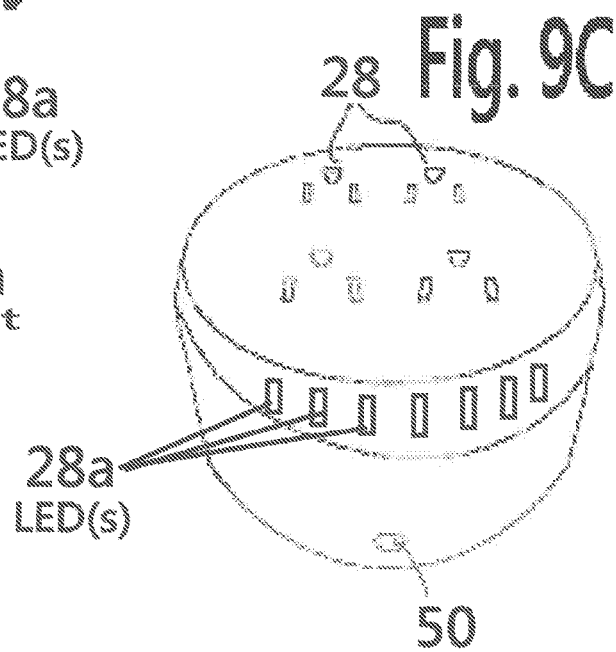
Fig. 9C
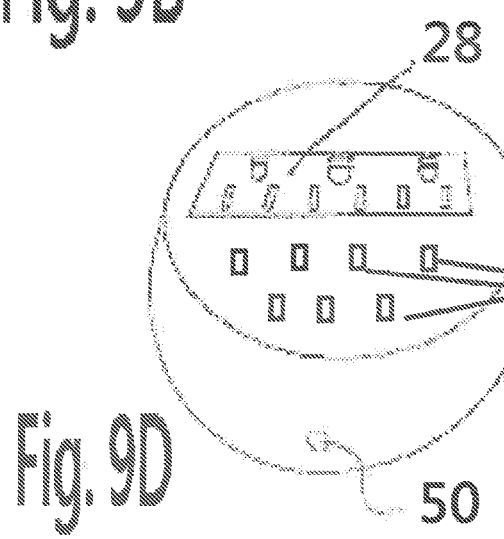
Fig. 9D
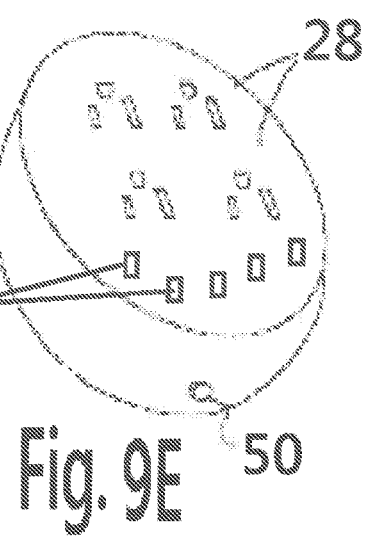
Fig. 9E

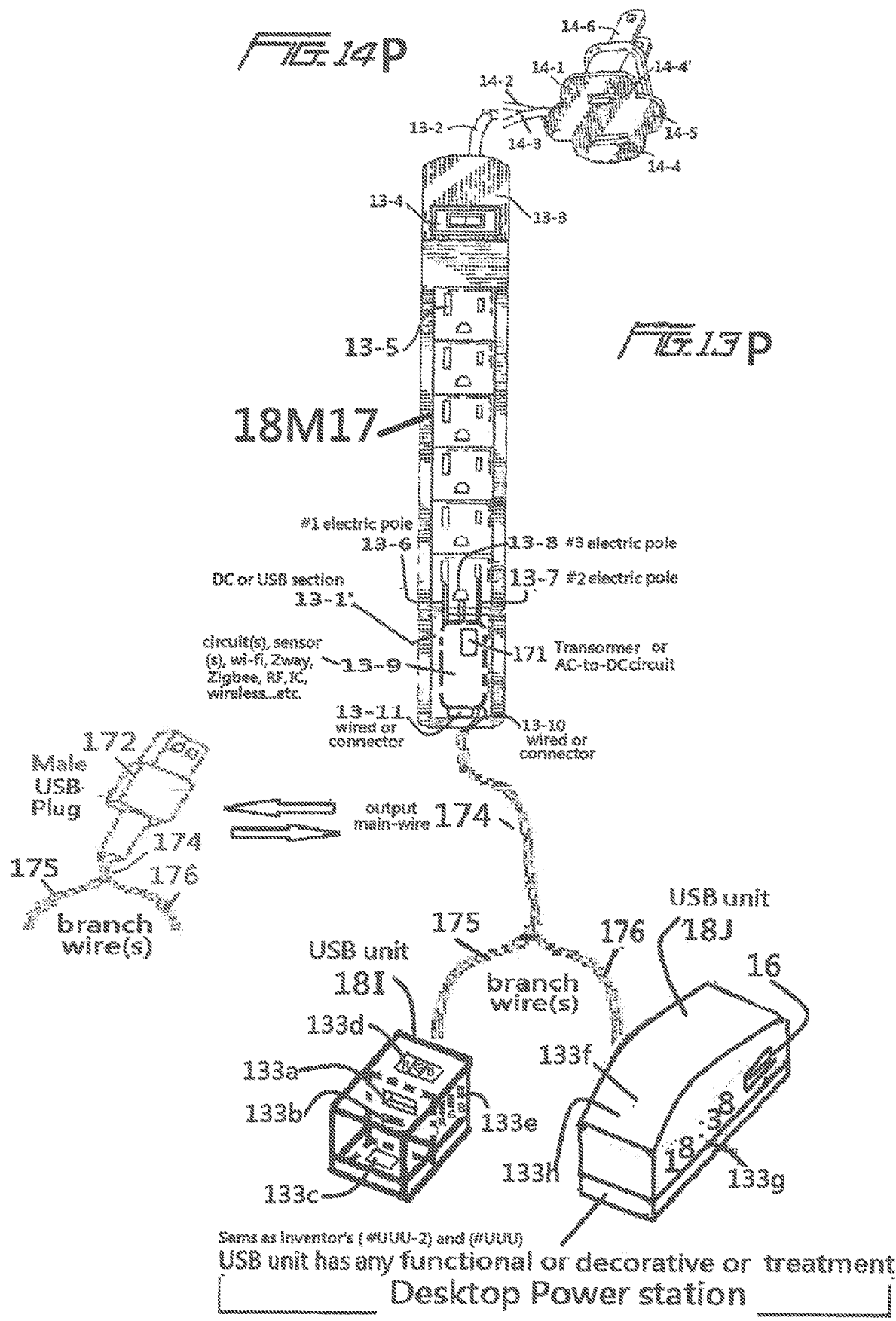

USB DEVICE HAS SEPARATED DISTANCE AWAY USB-UNIT(S) BY BRANCH-WIRE(S)

This application is CIP or Division for co-pending filing for

U.S. application Ser. No. 13/117,227 filed on May 27, 2011 (hereafter as #FFF-2011) and U.S. application Ser. No. 13/161,643 filed on Jun. 16, 2011 (# hereafter as #GGG-2011)

U.S. application Ser. No. 15/899,492 filed on Feb. 20, 2018 (hereafter as #UUU-2) which is CIP of U.S. application Ser. No. 15/340,367 filed on Nov. 1, 2016 (hereafter as #UUU-1) which is CIP of U.S. application Ser. No. 13/870,447 filed on Apr. 25, 2013 (hereafter as #UUU-2013) which is CIP of which is CIP of U.S. application Ser. No. 12/938,628 filed on Nov. 3, 2010 (hereafter as #UU-2010).

which is CIP of

U.S. Filing Ser. No. 14/951,872 (hereafter as #GGG-10) which is CIP filing of

U.S. Filing Ser. No. 14/870,601 (hereafter as #GGG-9), which is CIP filing of

U.S. Filing Ser. No. 14/834,613 (hereafter as #GGG-8), which is CIP

U.S. Filing Ser. No. 14/834,823 (hereafter as #GGG-7), which is CIP filing of

U.S. Filing Ser. No. 14/834,557 (hereafter as #GGG-6), which is CIP filing of

U.S. Filing Ser. No. 14/858,538 (hereafter as #GGG-5/1), which is CIP filing of

U.S. Filing Ser. No. 14/839,935 (hereafter as #GGG-5), which is CIP filing of

U.S. Filing Ser. No. 14/827,810 (hereafter as #GGG-4C), which is CIP filing of

U.S. Filing Ser. No. 14/189,062 (hereafter as #GGG-4), which is CIP filing of

U.S. Filing Ser. No. 14/643,026 (hereafter as #GGG-3C), which is CIP filing of

U.S. Filing Ser. No. 14/548,620 (hereafter as #GGG-2C), which is CIP filing of

U.S. Filing Ser. No. 14/548,561 (hereafter as #GGG-1C), which is CIP filing of

U.S. Filing Ser. No. 14/189,062 (hereafter as #GGG-3) which is CIP filing of

U.S. Pat. No. 8,911,137, which is CIP filing of

U.S. Pat. No. 8,915,608 (hereafter as #GGG-1), which is CIP filing of

U.S. Pat. No. 8,783,936 (hereafter as #GGG-2011)

(#GGG) family has all details discussion for the USB charging port features and method to making same.

This filing is Continue of filing of below 2 co-pending filing case (#GGG-2011) U.S. application Ser. No. 13/161,643 filed Jun. 16, 2011 &

(#FFF-2011) U.S. application Ser. No. 13/117,227 filed on May 27, 2011.

The current invention also CIP for

U.S. application Ser. No. 15/458,498 Filed on Mar. 14, 2017 (hereafter as #LLL-1)

which is CIP filing for

U.S. application Ser. No. 13/367,687 (hereafter as #LLL-2011) now pay issue fee.

U.S. application Ser. No. 12/938,628 filed on Nov. 3, 2010 (hereafter as #UU-2010) for Power strips or extension cord or LED light bar has built-in LED(s) and outlet(s) with additional added USB charger with USB-port(s).

Also, the current invention is Division filing for below listed filing case

U.S. Pat. No. 8,950,899, U.S. application Ser. No. 13/162,824 filed on Jun. 17, 2011 (hereafter as #HHH-2011)

U.S. Pat. No. 8,944,669, U.S. application Ser. No. 13/367,816 Filed on Feb. 7, 2012 (hereafter as #NNN)

U.S. Pat. No. 8,393,755 U.S. application Ser. No. 12/894,865 filed on Sep. 30, 2010 (hereafter as #T-1)

U.S. Pat. No. 8,083,392, U.S. application Ser. No. 12/887,709 filed on Sep. 22, 2010 (hereafter as #RR-10)

The current invention is related to the wire arrangement for at least one of USB charger device(s) with or without branch-wire(s) to connect each other in one system as co-pending U.S. application Ser. No. 13/117,227 filed on May 27, 2011 which is one year ahead of apple company announced the i-phone 5 with charging-port(s). It also disclosed in co-pending U.S. patent application Ser. No. 13/858,604, filed Apr. 8, 2013 (hereafter as #RRR).

The current invention is related to the power station with or without built-in functional or decorative items for current invention of desktop USB station or USB charger disclosed in co-pending U.S. patent application Ser. No. 13/863,073, filed on Apr. 15, 2013 (hereafter as #SSS).

The current invention is related to the power station with or without built-in functional or decorative items for current invention of desktop USB station or USB charger disclosed in co-pending U.S. patent application Ser. No. 13/870,253, filed on Apr. 25, 2013 (Now is U.S. Pat. No. 9,559,471) (hereafter as #TTT).

The current invention is related to the wire arrangement for a USB charger device or USB power station with or without built-in functional or decorative items for current invention of desktop USB station disclosed in co-pending U.S. patent application Ser. No. 13/858,604, filed Apr. 8, 2013.

The current invention is related to the power station with or without built-in functional or decorative items for current invention of desktop USB station, or having built-in LED units and a USB charger disclosed in co-pending U.S. patent application Ser. No. 13/863,073, filed Apr. 15, 2013.

BACKGROUND

According to the current invention, at least or plurality of USB-charger or USB power station(s) with or without built-in functional or decorative items for current invention of desktop USB station includes a wire arrangement for at least one or plurality separated USB-stations which has no built-in circuit(s). The said at least one of receiving-end(s) such as a USB-port, outlet receiving socket, or LED(s), or any combination thereof, that enables the (a) USB charger or (b)

USB power station(s) related product to be located on a desk surface or other hand-reachable location to offer more convenience to people.

The current invention's features include:

1. Hand-reachability, so that there is no need to bend the human body or knee to initiate charging, thereby preventing people from suffering waist or knee injury, which is especially critical for aged people.

2. Provide at least or more than one of separated power station(s) connect with a. external transformer or b. DC power source, both having main output-wire through plurality of branch-wire(s) to deliver DC current by #16 or #18 thinner gauge wires not same as AC-plug wire need at least #14 gauge wire to deliver the AC power.

3. Provide a built-in wire arrangement to coil, wrap, roll, store, and/or release an AC power wire or main-wire or branch wire(s) or other wires related to a USB charger or USB power station(s) operation as needed, so that there is no more mess involving AC wires or other wires for charging kits.

4. Provide at least one preferred attachment-kit, fixing-set, assembly parts, weight unit(s), and/or magnetic piece(s); to keep the built-in USB charger or separated more than one or USB power station(s) related products on a desk top or surface(s) without being moved by the weight of the AC power line or an external force, thereby keeping the products on the desk's surface(s) without drop to the floor.

5. The option of making large but thin products that people will use on a desktop or similar surface without require extra new space for USB Charger related products.

6. A USB charger output-end supply min. 1.0 Amp up to 15 Amp (from 5 to 60 watt), which is not obtainable from laptop USB ports or other portable or travel USB chargers, thereby reducing the long wait time conventionally required for charging electric or electronic devices.

7. The other preferred one of wire arrangement may be implemented by a roller, retractable means, spring means, or twist means to allow people to keep all charging related wires or AC power wires well stored and not make a mess.

These six features of the current invention offer people convenience for living.

The current invention has subject matter in common with the inventor's U.S. patent application Ser. No. 12/950,017, filed Nov. 29, 2010 (hereafter as #SS-2010), which discloses a multiple surface LED light with a rotating device that exposes LED light device(s), USB devices, and outlets devices built into a rotating substrate with more than one surface to offer multiple functions.

The current invention also has subject matter in common with the inventor's U.S. patent application Ser. No. 11/806, 285, filed May 31, 2007 (hereafter as #R-2007), which discloses a multiple function LED light device, and the inventor's U.S. Pat. No. 7,318,653 (hereafter as #B-2005 CIP of Ser. No. 10/954,189 filed on Oct. 1, 2004), which is directed to a multiple function wall cover (hereafter as #, as well as the inventor's U.S. Pat. No. 7,651,365 (hereafter as #B-05) plug-in rotatable outlets with built-in EL light element and U.S. Pat. No. 7,810,985 (hereafter as #F-05) plug-in non-rotatable plurality of outlets(s) with built-in EL light element. All these patented or pending cases relate to a light source with outlets devices to which the wire arrangement of the current invention may be applied.

Also by the current inventor are U.S. patent application Ser. No. 13/161,643, filed Jun. 16, 2011 (hereafter as #GGG-2011), directed to a desk top item with LED means and USB-unit(s) or USB-module(s) to charge other electric or digital-data devices and Ser. No. 13/117,227, filed May 27, 2011 (hereafter as #FFF-2011), directed to a plug-in wall mounted LED night light has built-in outlet(s) with additional USB-unit(s) for a variety of electric or digital-data devices.

The current invention differs from the arrangements disclosed in U.S. prior art at least in the follow respects:

(Prior 1) U.S. Pat. No. 7,736,033 (BHART) discloses a lamp base with an electric device recharge receptacle, and in particular an outlet device and a cigarette lighter built on a lamp base.

The lamp base includes circuitry that transforms an input AC current into a 12V DC automobile current, output, and further includes a plug-in device that transforms the input 12 VDC current into USB end current (5 Volt). This means that BHART's device at least needs two expensive circuits/transformers to transform the input 120 VAC wall outlets power supply into a USB 5 VDC output. This is not economical and nobody needs a 12 VDC output for household use. In contrast, the present invention directly transforms an input-end 120 VAC into an output-end 5 VDC, which is more practical than the arrangement disclosed by BHART.

(Prior 2) U.S. Patent Publication No. 2011-017703 discloses a
rotatable and concealable device which only has an outlet device with manual switch. The input 120 VAC power source is connected directly through a metal piece to deliver 120 VAC to the rotatable & concealable device's receptacles to offer 120 VAC current when another device is plugged into the receptacle. The '703 publication fails to disclose any USB charger concept, circuit, design and application, and so is not related to the current invention.

(Prior 3) U.S. Pat. No. 7,897,277 (Meyer et al.) discloses a reversible battery cartridge which is used to provide backup power for all kinds of lamp and mainly for power fail application. This has nothing to do with USB ports and USB charger applications, and therefore is totally different from the current invention, which is related to a device having (1) USB ports+ (2) USB charging+ (3) an outlet supply power source+ (4) an LED light and universal lamp base to fit for all kinds of existing lamp bases so as not to occupy any new desk top space because (5) the universal desk base overlays a top of the existing lamp base. Furthermore, the current invention has (6) an LED light incorporated with the above-listed features (1) (2) (3) (4) and (5), so that it becomes a unique practical universal power station, especially because (7) the current invention can be arranged to not only supply one kind of power to a charger, but also can supply different types of power to different electric or digital-data device(s).

(Prior 4) U.S. Pat. No. 6,474,823 discloses a laptop computer with a top illumination light. The computer uses a transformer to converting input AC power into 5 Volt DC current for internal use. However, there is no USB charger circuit inside the computer. Instead, the computer's external transformer directly delivers 5 VDC current to the USB port, so the computer system of this patent differs from the charger products of the current invention, which uses an internal USB charger circuit to convert 120 VAC into a 5 VDC USB charging output. As disclosed in this patent, the computer itself has an input-end current of 5 VDC and output-end current at the USB ports that is also 5 VDC, so there is no need for a USB charger circuit inside.

(Prior 5) US 005 008-8834 MILAN (1-1a) '834 teach a desk workstation,

The present invention relates to a computer desk having a power core base hub including an integrated power source and computer accessories port for connection to peripheral devices located on or within the computer desk.

VS. Current invention the USB power station, do not connect with computer peripheral device.

Current invention only charge communication device such as mobile phone and ipad which has USB charging ports from i-phone 5 date on 2012. So, MILAN unit is not same as current invention.

More particularly, the present invention relates to a computer desk having a power core base hub including an integrated power source for providing power to peripheral devices located on or within the computer desk, and for providing a stepped down power source to a USB hub board located within the power core base hub, and a plurality of USB communication ports on the USB hub board for interconnecting peripheral devices located on or within the computer desk to a computer.

V.S. current invention, the USB ports is Type A or Type C male plug of JUMP USB wire which other end is micro-USB or lightning (Apple company) which is not available on '834 filed date on 2004. '834 on 2004 has no any idea for USB wires with 2 different male plug to charger other product(s).

Currently, computer technology has become more advanced with an increasing number of computers related peripheral devices to assist a computer user. Since peripheral devices interface with the operating system of the computer, it is advantageous for the computer and the peripheral devices to be proximity to one another for accessibility purposes for the computer user. A universal serial bus (USB) is a universal communication standard for connecting and communicating various peripheral devices to a computer. The USB allows the transfer of data between the computer and the peripheral devices. The USB further allows peripheral devices to be added without requiring add-in cards, dip switch settings, IRQ's and the like. Peripheral devices using the USB may be plugged in and implemented immediately. The USB detects the peripheral devices set up on the system and configures the software to operate the peripheral device automatically without having to restart your computer. The USB connects multiple peripheral devices to the computer through use of USB ports on the back of the computer (usually two per PC) or a USE hub may be added to the system to connect (i.e. daisy chain) multiple peripheral devices together. Examples of devices that are used with the USB connection include a keyboard, a mouse, a scanner, a joystick and a digital camera. The USB is also capable of sensing the power that is required to operate the peripheral device and can supply the required power to the peripheral device.

VS. Current invention,
(1) USB power station do not have any data transfer and Not related to any computer peripheral device(s).
(2) '834 workstation plurality of USB connects multiple peripheral device to the computer . . . . Not same as current invention the USB power station is connect with external transformer to get 5 Volt DC current minimum 2.4 Amp to 20 Amp to share with at least one of built-in or separated USB power station which has at least one of USB-port(s). So, '834 is only connects with computer peripheral device for data transfer purpose.
(3) The '834 USB also capable to power the required power to the peripheral device from computer. VS current invention, the year 2004 '834 get power from computer output USB only can get Maximum 0.5 A to all computer peripheral device(s) that is enough for date transfer. The current invention is to charge the i-phone or i-pad or communication device need at least 2.4 Amp so can charge only one i-pad. If would like to charge more than one i-phone or i-pad need more than 3.4 Amp from at least one separated USB power station(s). The current invention has at least one of power station(s) and each had its own wire arrangement to connect or to assemble with the external transformer to get each of separated or built-in power station(s) inner at least USB port(s).

FIG. 2 shows the internal circuitry of the power core base hub 32. The power core base hub 32 includes a power board 38 and a USB hub board 40 encased within a single enclosure housing 36. The housing 36 is preferably made of plastic, but can be made of any type of material suitable to house the electrical components. A heat shield 42 separates the power board 38 from the USB hub board 40 so as to minimize the effects of the heat generated by the electrical power components of the power board 38. A power-in cord 44 is electrically attached to the power board 38 for receiving a power source (i.e. high voltage, alternating current 120V) from a main power supply such as an electrical wall outlet. The power board 38 may include a transformer for stepping down the power from a high voltage source to a low voltage source and an AC to DC converter for converting the stepped down power source from an alternating current power source to a direct current power source. The main power board may also include one or more circuits prior to the AC to DC converter and transformer for providing the 120V AC source to any computer accessory devices requiring the 120V AC source (i.e. CPU unit, video screen, printer, fax, or copier). A surge protector may also be incorporated in the power board 38 to shut down the power provided to any devices electrically attached to the power core base hub 32 in the event of a power surge or an overload on the main circuit of the main power supply.

V.S. current invention:
(1) '834 has built-in AC to DC transformer, current invention has external transformer to supply DC power from outside for at least one or plurality of separated desk top USB power station(s) with desired numbers of USB charging port(s) only to deliver DC power without transfer the data(s).
(2) '834 had one or more circuit PRIOR to the AC-to-DC circuit to transformer to supply other AC operated device . . . . The current invention do not have such concept.
(3) '834 all USB is belonging to USB HUB has at least 2 electric poles and 2 data delivery conductive-piece(s) which is not same as current invention for CHARGING purpose USB which only has (+) and (−) electrical pole(s) basing on the definition. So, basically the HUB and Charging USB are totally different on electric construction, theory, application, concepts.
(4) '834 all HUB USB only can apply for the computer its peripheral device(s) for data transfer or supply max. 500 ma current to these peripheral device(s). Because too low output power so not able to use for current invention for quickly charger minimum for 5 Volt 2.4 Amp or up to 20 Amp.

CONCLUSION: The '834 is totally different with current invention for any aspects.

(Prior 6)
US Prior art 2007-027-8996 "SO"
1-2-a: application Ser. No. 11/839,779 Filed: Aug. 16, 2007 Related U.S. Application Data
Continuation of application Ser. No. 11/401,443, filed on Apr. 11, 2006, now U.S. Pat. No. 7,273,384
VS. current invention Parent filed case→
Pub. No.: US 2007/0242485 A1
Pub. Date: Oct. 18, 2007, application Ser. No. 11/806, 285, filed: May 31, 2007,
Continuation of application Ser. No. 10/883,747, filed on Jul. 6, 2004, now abandoned.
Continuation of application Ser. No. 11/092,741, filed on Mar. 30, 2005, now U.S. Pat. No. 7,232,251.
Continuation of application Ser. No. 11/094,215, filed on Mar. 31, 2005.
Continuation of application Ser. No. 11/255,981, filed on Oct. 24, 2005.

Continuation of application Ser. No. 11/498,881, filed on Aug. 4, 2006.

Continuation of application Ser. No. 11/527,631, filed on Sep. 27, 2006.

Continuation of application Ser. No. 11/498,874, filed on Aug. 4, 2006.

→Current inventor parent filed case (#R-2007) which has parent filed case filed for multiple functions LED light device since 2004 to 2006 for LED night light has (1) Outlet (2) LED(s) for area or indicator light illumination.

The '996 has the outlet(s) and (LEDs), so, '996 is not a valid patent in front of the inventor's much earlier filed (#R-2007) with above listed 6 parent filed case is much earlier than '966 parent filed on Apr. 11, 2006. And (#R-2007) has total 6 Child filed case, 2 issued!

Besides the Filed date is later than inventor parent filed on earlier date Jul. 6, 2004, The '996 only has fixed one male plug not a recess female receiving USB-port(s) and its parent 10-749, 964 filed on Dec. 31, 2003 do not have any converter and USB plug the interchangeable plug bases (10) or adaptor body (20) encloses a power converter for output 5.5V DC current through the MALE USB Plug (29) or Mating socket (30) all belong for MALE PLUG (28) VS. current invention and parent filed (#R-Family) those has FEMALE RECEIVING USB-PORT(S) not same as '996 or '964 MALE PLUG direct to charge the be-charged items.

1-2b: The '996 or '964 both has fatal problem while incorporated MALE PLUG to directly charged be-charged products. This will limited for ONLY ONE SPECIFICATION MALE PLUG so only can charge only one product which has mating FEMALE RECEIVING PORTS to match the MALE plug.

VS. Current invention 1-2c: [0030] In the accompanying drawings there is schematically depicted a universal charger and power adaptor for use in different countries and with various type of portable electronic equipment. The power adaptor has interchangeable plug bases 10 for use in power outlets of different countries. The power adapted has three outputs 28, 30 at the remote end of an output cord 21, 61, 62 for connection of interchangeable adaptor tips that fit different types of electronic equipment. Two outputs 28 have a 5.5V output for charging or powering equipment that can normally be charged/powered from a computer USB port, such as mobile phones, PDAs, handheld computers and audio (MP3) players. Interchangeable adaptor tips for such equipment push fit with outputs 28. The third outlet, mating socket 30, has a variable voltage output for powering/charging laptop computers and the like. The adaptor has a selectable voltage setting for choosing the voltage output of mating socket 30. Other interchangeable adaptor tips 31 connect with mating socket 30 for use with laptop computers and the like.

VS. current inventor for the USB power station has at least or more than one USB power station(s) get power from one of external Transformer which each USB power station(s) has its own wires and built-in preferred numbers of FEMAIL USB ports not same as '996 for male plug(s) (28) (28) or mating male connector (30) to insert into outside FEMALE RECEIVING-PORT(S). So, '996 is totally not same as current invention for USB Power station(s) to receiver MALE USB PLUG to charge be-charger external products by additional and separated USB-Wire has at least one MALE-PLUG(S) on each end of USB-WIRE.

→CONCLUSION:

'996 is male plug to charge other products. Current invention offer Plurality number of USB power station(s) and each have its own wire connect with external Transformer output wire and each USB power station(s) has built-in numbers of female USB-port(s) to allow separated USB-wire to connect be-charged products which has no any limit for all models as long as use proper USB-wire.

(Prior 7) US Prior art US 2006-007-2271 JONES ET AL.

1-3a: '271 has following parts

PCD Tag: A device containing data that can provide access to that data to a PCD reader when in close approximity. effectively, a contactless memory storage device.

PCD Reader: A device or circuit that can read and/or write data from/to a PCD tag.

Receptacle: A set of connector sockets that provides a means to connect electrical devices equipped with a compatible plug to a source of electricity.

Plug: A set of connector pins/blades that provides a means to connect an attached electrical device to a source of electricity by way of a compatible receptacle.

Electrical Device Load Rating: The limit for normal current or power consumption for an electrical device under normal operating conditions (e.g., 10 Amps 1250 Watts 125 Volts).

Load: Current drawn or power consumed.

Measuring Device: A means for directly or indirectly determining the value of a parameter.

Control Circuit: A means for accepting data or inputs, collecting data, storing and retrieving data, making decisions or calculations, and setting an output level or state based upon the data, choice or result.

VS. current invention do not have all these parts for USB Power station(s).

[Conclusion:] '271 is nothing to do with current invention because '271 major for provides an electrical power distribution system and receptacles with above listed special components.

(Prior 8) US Prior art 2010-000-6008 CHEONG 1-4a: '008 power supply is comprising (1) Power and (2) AC and (3) DC module(s) and each module has its own housing.

VS. current invention for Desktop USB charging station, inside the charging station all circuit without any its own housing.

1-4b: '008 each AC or DC output-current need go to at least one built-in own housing "connector" connected with long output-AC or output-DC current output-wire to deliver power or AC or DC current to other device(s).

VS. current invention there no need all '008 these plurality of connector(s) to deliver the power or AC or DC current to other device(s).

1-4c: '008 each AC or DC module to output AC or DC current have to go through built-in output-current long wire which is very long and need wrap around the hub.

VS. current invention only has input-current long wire not same as '008 for output-current wire inside housing and need to wrap around.

1-4d: '008 each output AC or DC current have to have "Male connector" such as AC plug (174) or DC plug (272) both connect with adaptor (274) or (86).

'008 all the AC or DC output terminals are (1) '008 need male adaptor (274) (86) and (2) The '008 FIG. 14 show DC module for DC output need (i) DC cable assembly (270) one end has (ii) connector (282) on one end of cable, and other end need with (iii) male DC connector (272)→VS current invention has no such (Vi) connector and (vii) output-DC long-Wires.

(3) The '008 FIG. 9 show AC module for AC output has (i) cable connector (174) and further more need $2^{nd}$ power connectors (180a,b,c,d) to deliver the current→VS current invention, No need such (vi) cable connector and (vii) $2^{nd}$ power connectors.

(4) The '008 FIG. 4 show the Power module to output the current which need get power from AC through AC/DC or DC/DC circuit on (i) $1^{st}$ circuit board (90) and go through (ii) cable connector (94) and (iii) cable (32) to (iv) $1^{st}$ connector (82) or (v) $2^{nd}$ connector (84) both are not the USB connector to receiving (vi) the adaptor which is (vii) MAIL PLUG to connect other product→VS. current invention, the current invention do not have these (i) (ii) (iii) (iv) (v) (vi) (vii) to deliver the output DC current. Furthermore, current invention for desktop USB power station all the output power is from FEMALE receiving USB port(s) or AC-outlet(s) which no need any OUTPUT AC or DC current wires inside each AC module or DC module. So, the '008 FIGS. 4, 9. 14 parts and accessories have following (A) each power and AC and DC module have its own housing, (B) AC or DC current output arrangement with AC current output-wire and DC current output-wire, (C) Each module and current output-wire need work with built-in connector(s) and plurality of PCB(s)

(D) All output AC or DC by MALE plug(s) or Adaptor(s).

(E) each of AC, DC, Power out-put need built-in current-output wire(s)

(F) Each of Power, AC, DC module have each housing and need assembly together to define a '008 power which is too costly and can do by a single PCB and install within the current invention external or internal of housing.

CONCLUSION: Current invention

1. Do not have above (A+B+C+D+E+F) features, concept, parts, accessories, connectors, output-current long-wire, male connector(s) to delivery output-current.

2. Current invention only need one PCB can have any kind of combination for (i) input AC and (ii) AC/DC and (iii) DC/DC (iv) rechargeable battery (v) backup batteries, and (vi) other sensor, trigger, wireless system, control system fit into external or built-in one housing to supply power for all kind of application as co-pending or 10 issued US patent of (#GGG family).

3. Current invention to supply power is through the external USB wired to get USB power or the female AC receiving outlet(s) to allow AC operated products male plug(s) insert into the female AC receiving outlet(s).

Hence, '008 is nothing to do with current invention.

(Prior 8) US prior Art 2011-008-4660 MCSWEYN 5-1a;

The '066 plug-in wall Charger incorporated with LED(s) for night light function to offer soft glow light & supply power to other device as below text;

As shown in FIG. 10, the body 120 of the removable charger 100 may be provided with two side apertures to permit dual side ground contacts 125. A power tip 130 may extend from the insertion end of the body 120. The side ground contacts 125 and the power tip 130 may be spring loaded, for example, to ensure a tight, solid mechanical and electrical connection when the removable charger 100 is inserted and seated in the 12 V docking port 105.

Another variation in accordance with aspects of the present invention may be a Light Emitting Diode (LED) on one or both of the removable charger 100 and the body 20 to indicate that one or both of the USB 5V connection ports, 30 and 130, are receiving power. In another variation in accordance with aspects of the present invention, one or both of removable charger 100 and the wall charger 10 may be provided with a built-in light.

Light Emitting Diode (LED) technology, for example, may be used in the light because of the reduced current requirements and the lower level of lighting generally desirable in a light that may be used at night. But any soft glow lighting mechanism may be incorporated. Pub. No.: US 2011/0084660 A1 (43) Pub. Date: Apr. 14, 2011

(21) application Ser. No. 12/722,018 (22) Filed: Mar. 11, 2010

Related U.S. Application Data (60) Provisional application No. 61/249,933, filed on Oct. 8-2009.

'660 is not a valid patent because has details description as above column [0031] has (1) LED(s)

For (2) LED Night light to offer (3) indicator light and (4) supply power to other device(s).

'660 these (4) key word of '660 [Column 0031] as above attached is 2 year later filed date of inventor co-pending and issued patents which filed on May 31, 2007 and had a lot of parent filed cases for multiple functions LED night light including below listed.

This application is a continuation of (#R-3), now is U.S. Pat. No. 10,487,999

Multiple function LED night light

U.S. patent application Ser. No. 14/739,499, filed Jun. 15, 2015,

This application is a continuation of (#R-2), now allowed Multiple function LED night light U.S. patent application Ser. No. 14/739,666, filed Jun. 15, 2015, This application is a continuation of (#R-1) U.S. Pat. No. 10,184,624

Multiple function LED night light

U.S. patent application Ser. No. 14/739,397, filed Jun. 15, 2015, now is U.S. Pat. No. 10,184,624 issued on Jan. 22, 2019

This application is a continuation of (#R-07) (Still pending for over 12 years)

U.S. patent application Ser. No. 11/806,285, filed May 31, 2007,

This application is a continuation of (#Q-07) now U.S. Pat. No. 7,632,004

LED night light with more than one optics means

U.S. patent application Ser. No. 11/806,284, filed May 31, 2007, now is U.S. Pat. No. 7,632,004 issued on Dec. 15, 2009

This application is a continuation of (#K-06)

LED night light has area-illumination by multiple time reflection and refraction 20

U.S. application Ser. No. 11/498,874 file don Aug. 4, 2006 (Still pending)

This application is a continuation of

U.S. application Ser. No. 10/954,189 filed on Oct. 1, 2004.

This application is a continuation of (M-06) U.S. Pat. No. 7,611,253 multiple functions LED night light with air freshener

U.S. patent application Ser. No. 11/527,628, filed Sep. 27, 2006, now is U.S. Pat. No. 7,611,253 issue on Nov. 3, 2009, This application is a continuation of (#L) now U.S. Pat. No. 8,545,090

LED night light with changeable display unit

U.S. patent application Ser. No. 11/527,629, filed Sep. 27, 2006, now is U.S. Pat. No. 8,545,090 issue on Oct. 1, 2013, This application is a continuation of (#J-6) now is U.S. Pat. No. 9,128,692

LED night light with time piece

U.S. patent application Ser. No. 14/252,102, filed Apr. 14, 2014, now is U.S. Pat. No. 9,128,692 issue on Sep. 8, 2015, This application is a continuation of (#J5) now is U.S. Pat. No. 8,811,122

LED night light with time piece

U.S. patent application Ser. No. 13/428,086, filed Mar. 23, 2012, now is U.S. Pat. No. 8,811,122 issue on Aug. 19, 2014, This application is a continuation of (#J-4) now is U.S. Pat. No. 8,289,814

LED night light with time piece

U.S. patent application Ser. No. 12/894,782, filed Sep. 30, 2010, now is U.S. Pat. No. 8,289,814 issue on Oct. 16, 2012, This application is a continuation of (#J-3) now is U.S. Pat. No. 8,164,984

LED night light with time piece

U.S. patent application Ser. No. 12/545,922, filed Aug. 24, 2009, now is U.S. Pat. No. 8,164,984 issue on Apr. 24, 2012, This application is a continuation of (January 2006) U.S. Pat. No. 7,568,829 poly night light U.S. patent application Ser. No. 11/498,881, filed Aug. 4, 2006, now is U.S. Pat. No. 7,568,829 issue on Aug. 4, 2009, This application is a continuation of (#H-1) U.S. Pat. No. 8,029,182 multiple light source night light U.S. patent application Ser. No. 12/546,012, filed Aug. 24, 2009, now is U.S. Pat. No. 8,029,182 issue on Oct. 4, 2011, which is a continuation of (#H-2005) U.S. Pat. No. 7,455,444

Multiple light source Night light

U.S. patent application Ser. No. 11/255,981, filed Oct. 24, 2005, now is U.S. Pat. No. 7,455,444 issued on Nov. 25, 2008, which is CIP of (#E-2005) U.S. Pat. No. 7,909,477 LED night light with liquid optics medium U.S. application Ser. No. 11/094,215 filed on Mar. 31, 2005 now is U.S. Pat. No. 7,909,477 issue on Mar. 22, 2011, which is CIP of (#D-2005) U.S. Pat. No. 7,997,785 Linear tube night light with changeable patterns U.S. application Ser. No. 11/092,742 filed on May 30, 2005 now is U.S. Pat. No. 7,997,785 issue on Aug. 16, 2011, which is CIP of (#C-2005) U.S. Pat. No. 7,232,251 Night light with Fiber Optics U.S. application Ser. No. 11/092,741 filed on May 30, 2005 now is U.S. Pat. No. 7,232,251 issue on Jun. 19, 2007, which is CIP of (#B-2005) U.S. Pat. No. 7,318,653 Multiple Function wall cover plate U.S. application Ser. No. 11/094,156 filed on May 31, 2005 now is U.S. Pat. No. 7,318,653 issue on Jan. 15, 2008, which is CIP of (#-2004) now is abandoned U.S. application Ser. No. 10/954,189 filed on Oct. 1, 2004 now is abandoned, which is CIP of (#A-2005) U.S. Pat. No. 7,810,985 Multiple function EL night light U.S. application Ser. No. 11/094,155 filed on Mar. 31, 2005 now is U.S. Pat. No. 7,810,985 issue on Oct. 12, 2010, The current invention also is continuously filing of (VVV-1)

Multiple function night light has built-in USB and light means

U.S. application Ser. No. 14/817,675 filed on Aug. 4, 2015

Which is continuously filing of (#VVV)

Multiple function night light has built-in USB and light means

U.S. application Ser. No. 13/910,295 filed on Jun. 5, 2013

Which is continuously filing of (#RRR)

U.S. application Ser. No. 13/858,604 filed on Apr. 8, 2013

Which is continuously filing of (#FFF)

Universal module has USB-unit or/and outlet-unit(s) for variety of electric or digital data device(s)

U.S. application Ser. No. 13/117,227 filed on May 27, 2011

Which is CIP of (#J4) Ser. No. 12/894,782 filed on Sep. 30, 2010,

Which is CIP of Ser. No. 12/502,661 filed on Jul. 14, 2009

Which is CIP of (#J-2) Ser. No. 12/292,580 filed on Nov. 21, 2008

Which is CIP of Ser. No. 12/566,322 filed on Sep. 24, 2009

Which is CIP of (#K) Ser. No. 11/498,874 filed on Aug. 4, 2006,

Which is CIP of Ser. No. 11/527,627 filed on Sep. 27, 2006,

Which is CIP of (#L) 12-622,000 filed on Nov. 19, 2009,

Which is CIP of Ser. No. 12/624,621 filed on Nov. 24, 2009,

And current invention also is Continuous filing of (#FF-1) "LED project Night Light" now is U.S. Pat. No. 8,721,160 Ser. No. 12/914,584 filed on Oct. 28, 2010, Div. of Ser. No. 12/318,470 filed on Dec. 30, 2008, May 13, 2014 issues.

Which is CIP of (#X) LED light with changeable LED position with preferable power source U.S. application Ser. No. 12/073,889 filed on Mar. 11, 2008, now is U.S. Pat. No. 8,827,511 issued on Sep. 9, 2014

Which is CIP of (#L) "LED night light with interchangeable display unit" now is U.S. Pat. No. 8,545,090

U.S. application Ser. No. 11/527,629 filed Sep. 27, 2006, U.S. Pat. No. 8,545,090 issued Oct. 1, 2013

Which is CIP of (#T-1) LED light device with changeable features now is U.S. Pat. No. 8,393,755

U.S. application Ser. No. 12/894,865 filed on Sep. 30, 2010 U.S. Pat. No. 8,393,755 issued Mar. 12, 2013

Which is CIP of (#J-5) "Time piece with LED night light" now is U.S. Pat. No. 8,811,122

U.S. application Ser. No. 13/428,086 filed Mar. 23, 2012, Aug. 19, 2014 issued.

Which is CIP U.S. application Ser. No. 12/292,580 filed on Nov. 21, 2008 U.S. Pat. No. 8,305,846

Which is CIP U.S. application Ser. No. 11/527,631 filed Sep. 27, 2006.

Which is CIP of (#J-4) "Time Piece with LED night light" now is U.S. Pat. No. 8,289,814

U.S. application Ser. No. 12/894,782 filed Sep. 30, 2010,

Which is CIP of U.S. application Ser. No. 12/545,992 filed Aug. 24, 2009,

Which is CIP of U.S. application Ser. No. 12/292,580 filed on Nov. 21, 2008,

Which is CIP of U.S. application Ser. No. 11/527,631 filed Sep. 27, 2006.

Which is CIP of (#J-2) "Time piece with LED night light" now is U.S. Pat. No. 8,305,846

U.S. application Ser. No. 12/292,580 filed Nov. 21, 2008,

CIP of U.S. application Ser. No. 11/527,631 filed Sep. 27, 2006

So, The '660 is not invalid filed case basing on [column (0031)] as above (4) key parts is same as above listed issued and co-pending filed case, Especially all (4) Key parts is identically with (#R-3) (#R-1) issued patent which parent filed on May 31, 2007 (2 years ahead of '660 parent 2009 fled date or 3 years ahead of 2011-008-4660 MCSWEVN).

5-1b: '660 is one or plug-in USB power unit

'660 ABSTRACT

A wall charger includes a body that has at least one prong configured to be connected to an alternating current (AC) power source, a Universal Serial Bus (USB) connection port, the USB connection port being electrically connected to the at least one prong, and a docking port, and a removable charger, wherein the docking port is configured to slidably receive the movable charger, the docking port being electrically connected to the at least one prong. In another aspect of the disclosure, the removable charger comprises a second USB connection port electrically connected to the at least one prong. In yet another aspect of the disclosure, a method for charging at least one portable electronic device with the wall charger includes connecting the at least one prong to an AC power source and connecting a portable electronic device (PED) to the USB connection port.

→VS Current invention, (1) Is for desktop USB power station, Not same as '660 Plug-in Wall charger (20).

(2) Has the USB ports which is fixed and powered by External Transformer output 5 VDC Not same as '660 which is built-in wall charger (10) converts the AC to DC {column [0033] FIG. 11 line 5} not from external AC-to-DC transformer.

(3) Connect with external transformer output DC current at 5 VDC, Not Same as '660 the USB connection port being electrically connected to the at least one prong. Prong output is 120 Volt how to connect with USB connection port??

→The current invention does not have docking port to received cigarette plug-unit which is powered by 12 VDC and furthermore the Cigarette Plug-Unit has built-in circuit to change 12 VDC to USB port need 5 VDC. '660 has docking port to receive cigarette-unit powered by 12 VDC and had built-in $2^{nd}$ USB connection port which output 5 VDC so had built-in $2^{nd}$ circuit inside to change 12 VDC to 5 VDC.

{column [0033]} FIG. 11 provides a circuit block diagram illustrating the basic electrical components of the wall charger 10, including those of the separately removable charger 100. When the wall charger 10 is plugged into an AC outlet, a rectifier in the body 20 of the wall charger 10 converts the AC to DC for supplying current, preferably in the range of 1 Amp, to the USB 5V connection ports 30 and the 12V DC docking port 105. DC to DC converters are used to provide an output DC voltage to the permanent USB 5V connection port 30 of 5V and an output DC voltage to the 12V DC docking port 105 of 12V. A separate DC to DC converter is provided in the removable charger 100 so that when the charger is connected to the 12V DC docking port 105 of the wall charger 10, or any other 12V power source, an output DC voltage of 5V is provided to the removable USB 5V connection port 130.

Conclusion: '660 is plug-in by prong wall charger which different with desktop USB power station(s) has at least one station(s) those are powered by external transformer which offer DC power for USB ports.

'660 has built-in converter (10) to change AC to DC to come out 2 DC Voltage, one is 12 VDC to removable charger (100) fit into the ducking port (105), One is 5 VDC for permanent USB-port (30).

(Prior 9) U.S. Pat. No. 8,529,289 U.S. application Ser. No. 13/568,833 filed on Aug. 7, 2012 and U.S. Pat. No. 9,028,274 U.S. application Ser. No. 13/962,627 filed on Aug. 8, 2013 Quirky shown the outlet device has transforming shape and construction is much later than current invention inventor's earlier and still pending case U.S. application Ser. No. 12/938,628 filed on Nov. 3, 2010 (hereafter as #UU-2010) has both the transforming construction for outlet from T-shape to I-shape. The also, the co-pending filing U.S. application Ser. No. 13/17,227 Filed on May 27, 2011 (hereafter #FFF) also disclosure the USB and Outlet device on wall mounted and desk top device on FIGS. Furthermore, the U.S. application Ser. No. 12/887,709 (hereafter as #RR-2010) filed on Sep. 22, 2010, And U.S. application Ser. No. 13/162,284 Filed on Jun. 17, 2011 (#HHH-2011), and U.S. application Ser. No. 12/894,865 Filed on Sep. 30, 2010, (hereafter as #T-1-2010) and U.S. application Ser. No. 12/003,691 filed on Dec. 31, 2007 (hereafter as #V-2008), and U.S. application Ser. No. 13/296,469 filed on Nov. 15, 2011 (hereafter as #110, and U.S. application Ser. No. 13/296,508 filed on Nov. 15, 2011 (hereafter #JJJ-2011), and U.S. application Ser. No. 13/295,307 filed on Nov. 15, 2011 (hereafter as #KKK-2011), and U.S. application Ser. No. 12/149,963 filed on May 12, 2008 (hereafter as #Z-2008).

All these inventor's co-pending or earlier filed cases still pending so all these concepts for $1^{st}$ invention filed the LED(s) and Outlet(s) earlier than 2006 and added USB charger filed earlier then 2010 before i-phone and i-pad with USB-port(s) from i-phone 5 on 2012. The current invention is Division and/or Continue and/or CIP for LED and outlet with additional USB Charger, Power station with LED(s) or-and outlet or-and USB unit should be still fall within the current filing and parent claims. On other the Qirky any later filed cases should become invalid for copy the current co-inventor parent filing spirits.

Further, The current filing case is CIP of the Above list for (#GGG) family for desktop USB applications only difference is current invention has all the Wire arrangements and lack of the LED light install on arms or stand or pole which let people can have higher level of light source. The current invention also lacks the audio related functions.

Because of the above-described differences, the current invention has at least the following advantages: A. It offers the most convenient way to use USB ports and/or other power outlets and LED units on a desk surface within a hand-reachable distance. The current invention allows all power stations or products to be installed on the desk top very steadily and overcome the super heavy duty of the power cord, which extends from the wall outlet to the power station or product and exerts a pulling force as a result of the cord's weight. The normal design for all marketed extension cords with built-in outlets or additional features such as USB ports, audio-ports, video-ports, internet-ports, or other electric's ports is not capable of being put on a desk top because the power-cord's weight is way too heavy if the outlet's power cords meet safety authorities' requirement that power cords use 10, 12, 14, or 16 gauge wire. Such a very heavy-duty cord, which may have different lengths of from 1 foot to 100 feet is impossible to install on a desktop. Furthermore, such a conventional outlet device does not really need to be put on a desktop because there are too few occasions to plug or unplug the plugs of electric or electronic devices into or from the outlet device. However, the current invention has built-in USB ports or LED light devices, for which there is a need to connect to the USB-ports or turn on-off the said LED unit(s) many times per day or at least once a day because of the many devices, such as cellphones, mobile phones, smartphones, I-Pads, and panel communication or consumer computer devices that need to be charged from USB ports. The current invention offers the most continent to put the USB-ports and LED units on the desk top to prevent from people bend the body and knee down to connect the grounded multiple function extension cord or wall mounted USB ports, The current invention offers the most convenient way for people to get power from built-in outlets or USB ports and also provide functions of built-in LED units just on a desk top. This is a major concept for the current invention.

B. The current invention offers a simple way to install a power station or products on a desk surface so that there is no need for people to bend their body or knee to a lower position in order to obtain charging and prevent injury or damage to the human waist and knee. Furthermore, the current invention one power station circuit to supply more than one of USB-unit(s) which separated with other housing of USB-unit(s) and each of separated USB-unit(s) has its own branch-wire to connect with the power source which is one of (1) Plug-in wall transformer, or (2) external DC power source, (3) Main power station has built-in AC-to-DC circuit to output pre-determined DC current for USB-port(s) built-in more than one of the USB-unit(s) which get power by branch-wire(s) with or without connector, quickly connectors, wired kits.

Furthermore, the separated USB-unit(s) (18 FIG. 4) of USB power station system. The output main-wire and branch-wire(s) is one of (aa) DC power from branch-wires and main output wire (172) by USB-plug, or (bb) DC power from branch-wires and main output-wire (171) by external AC-to-DC circuit or transformer, or (cc) DC power from branch-wires and main output-wire (71) from AC-to-DC circuit built-in of desktop power station.

It is appreciated all these wire arrangements for output main-wire and plurality of branch-wire(s) with preferred length so can have only one power station with many individual housing USB-unit(s) to put on many different locations to save people money.

The said plurality separated individual USB-units has its preferred length so can have one power station on living room and put separated individual USB-unit(s) on different desk or table or couch or seat to offer each seated person to charge their i-phone or i-pad as the earlier (#FFF-2011) FIGS. shown the more than one USB-unit(s) connect with USB-plug or external transformer or AC-plug power station circuit.

It is appreciated all the other US prior arts which filed before 2010 is not able to supply USB output current higher than 1.0 Amp because USB 3.0 which can supply bigger current up to 2 Amp announced on 2010. Also, I-phone and I-pad applied Type A to get power and input DC power from Micro-USB, Type C is start from 2012 of i-phone 5 on 2012. Majority power station or desktop items has the USB charger which 100% is male-plug to directly connect with be-charge other phone before 2012, even i-phone 1 to 4 use the 30 pins female receiving port, and other phone use different female receiving port(s). Hence, any patent filed before 2010 is not proper US prior art again the current invention (#FFF-2011) and (#GGG-2011) filed case products has FEMALE receiving port(s) which is male-plug of TYPE A of external outside one end of USB-wire. Other at least one of male USB-plug is one of micro-USB, or others which matching the be-charged products female receiving port(s).

C. The power station of the invention can be adapted to include the unique features described in the inventor's co-pending U.S. patent filings in order to supply power to charge the majority of electric, digital-data, audio, video, or internet devices on a desk top without the need to frequently bend the body to or near the ground when connecting to an outlet or USB port, or making use of an LED unit. Wherein, the charging or DC current delivery between desktop USB power station itself or branched USB-unit(s) to be-charged products by external USB-wire(s) which has at least two end(s) with at least one of male-plug(s) on each one end.

This is not same as all Desktop items with USB charger before inventor earlier and parent filed case. Those out-of-date USB charger device for built-in or added-on has MALE PLUG which matching all kind of different FEMALE receiving port(s) of NOKIA, ERICSON, SONY, MOTOROLA and each of them with different FEMAL receiving ports so not good for universal until 2012 i-phone 5 start to incorporate with external USB wire has 2 ends at least one end is Type A to get power and other end is preferred female receiving ports, so only need have right USB wire, the said Desktop or Wall mounted USB charge can have uniform have Type A USB-Female receiving ports to get universal products.

The current invention may also be applied to the following:

(A) A desktop LED light device having rotatable outlets or electric receiving sockets as disclosed in co-pending U.S. patent application Ser. No. 12/950,017, filed Nov. 19, 2010;

(B) an electrical device having a built-in universal USB-unit(s) and outlet-unit(s), as disclosed in co-pending U.S. patent application Ser. No. 13/117,227, filed May 27, 2011;

(C) a desktop LED device having a USB-unit(s) or outlet-unit(s) to charge an electric or digital device, as disclosed in co-pending U.S. patent application Ser. No. 13/161,643, filed Jun. 16, 2011; and (D) a multiple function LED night light as disclosed in U.S. patent application Ser. No. 11/806,285, filed May 31, 2007.

The current invention may also use the following concepts described in the following LED-related filing cases of the inventor: (1) a project light, (2) more than one function, (3) adjustable focus, (4) adjustable angle, (5) elastic contact points, (6) an LED heat solution, (7) heat sensitive parts installation, and (8) extend means, disclosed in the inventor's U.S. patent application Ser. Nos. 13/367,758; 13/367,687; 13/296,508; 13/295,301; 13/021,107; 12/950,017; 12/938,564; 12/886,832; 12/876,507; 12/771,003; 13/021,124; 12/624,621; 12/622,000; 12/318,470; 12/914,584; 12/834,435; 12/292,153; 12/907,443; 12/232,505; 11/806,711; and 11/806,285.

The current invention also has subject matter in common with the inventor's U.S. patent application Ser. No. 13/295,301 ("The Device has built-in Digital Data means and Powered by unlimited power source of light device"); Ser. No. 13/296,508 ("The Device has built-in Digital Data means and power unlimited power source of LED Bulb"); Ser. No. 13/296,460 ("The device has built-in Digital data means and powered by unlimited power source of Lamp Holder"); Ser. No. 12/951,501 ("Lamp Holder has built-in LED Night light"); Ser. No. 12/950,017 ("Multiple surface LED light"); Ser. No. 13/162,824 ("Light device with display means has track-means and removable LED-unit(s)"); Ser. No. 12/938,628 ("LED light fixture has outlet(s) and removable LED unit(s)"); Ser. No. 12/887,700 ("Light fixture with self-power removable LED unit(s)"); Ser. No. 12/149,963 (now U.S. Pat. No. 7,722,230); Ser. No. 12/073,095 (now U.S. Pat. No. 7,726,869); Ser. Nos. 12/073,889; 12/007,076 (now U.S. Pat. No. 7,726,841); Ser. No. 12/003,691 (now U.S. Pat. No. 7,726,839), and Ser. No. 12/894,865.

In addition to the above, light device related patent applications of the inventor include U.S. patent application Ser. Nos. 13/295,301, 13/296,469, 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11/527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156, 11/094,155, 10/954,189, 10/902,123, 10/883,719, 10/883,747, 10/341,519, 12/545,992, 12/292,580, 12/710,918, 12/624,621, 12/622,000, 12/318,471, 12/318,470, 12/318,473, 12/292,153, 12/710,561, 12/710,918, 12/711,456, and 12/771,003.

The relevance of the following U.S. patent applications of the inventor can be understood from the titles listed in parentheses:

U.S. application Ser. No. 13/295,301 ("Device has built-in digital data means and powered by unlimited power source for Lamp holder");

U.S. application Ser. No. 13/296,469 ("Device has built-in digital data means and powered by unlimited power source for light Device");

U.S. application Ser. No. 12/951,501 ("Lamp Holder has built-in LED light");

U.S. application Ser. No. 12/771,003 ("LED light has geometric-unit(s) incorporated project means");

U.S. application Ser. No. 12/711,456 ("LED power failure Light");

U.S. application Ser. No. 12/710,561 ("LED light device has special effects");

U.S. application Ser. No. 12/710,918 ("LED light device has more than 1 reflective means for plurality of image");

U.S. application Ser. No. 12/624,621 ("projection device or assembly for variety of LED light");

U.S. application Ser. No. 12/622,000 ("Interchangeable Universal Kits for all LED light");

U.S. application Ser. No. 12/318,471 ("LED night light with pinhole imaging");

U.S. application Ser. No. 12/318,470 ("LED night light with Projection features");

U.S. application Ser. No. 12/318,473 ("LED night light with laser or hologram element");

U.S. application Ser. No. 12/292,153 ("LED night light with Projection or imaging features");

U.S. application Ser. No. 12/232,505 ("LED night light with Projection features");

U.S. application Ser. No. 12/149,963 ("Removable LED light device") [Ser. No. 12/149,964 ("Surface Mounted device with LED light");

U.S. application Ser. No. 12/073,095 ("LED Track light device");

U.S. application Ser. No. 12/073,889 ("LED light with changeable position with Preferable power source")

U.S. application Ser. No. 12/007,076 ("LED light with changeable geometric system");

U.S. application Ser. No. 12/003,691 ("LED light with changeable geometric dimension features");

U.S. application Ser. No. 12/003,809 ("LED light with changeable features");

U.S. application Ser. No. 11/806,711 ("Multiple LED light with adjustable angle features");

U.S. application Ser. No. 11/806,285 ("LED Night light with outlet device"); Ser. No. 11/806,284 ("LED Night light with
more than 1 optics means");

U.S. application Ser. No. 11/527,628 ("Multiple function Night light with air fresh-ener");

U.S. application Ser. No. 11/527,629 ("LED Night light with interchangeable display unit");

U.S. application Ser. No. 11/498,874 ("Area illumination Night light");

U.S. application Ser. No. 11/527,631 ("LED Time piece night light");

U.S. application Ser. No. 12/545,992 ("LED time piece Night light");

U.S. application Ser. No. 12/292,580 ("LED Time Piece Night light")

U.S. application Ser. No. 11/498,881 ("Poly Night light");

U.S. application Ser. No. 11/255,981 ("Multiple light source Night Light");

U.S. application Ser. No. 11/184,771 ("Light Device with EL elements");

U.S. application Ser. No. 11/152,063 ("Outlet adaptor with EL");

U.S. application Ser. No. 11/094,215 ("LED night light with liquid medium");

U.S. application Ser. No. 11/094,215 ("LED Night light with Liquid optics medium");

U.S. application Ser. No. 11/092,741 ("Night light with fiber optics");

U.S. application Ser. No. 10/883,747 ("Fiber Optic light kits for footwear");

U.S. application Ser. No. 11/498,874 ("Area Illumination for LED night light");

U.S. application Ser. No. 11/527,629 ("Time Piece with LED night light");

U.S. application Ser. No. 11/527,628 ("Multiple Function Night light with Air Freshener");

U.S. application Ser. No. 11/806,284 ("LED Night light with more than one optics mediums");

U.S. application Ser. No. 11/806,285 ("LED Night Light with multiple function"); and U.S. application Ser. No. 11/806,711 ("Multiple LEDs Light with adjustable angle function").

The inclusion of any of the features disclosed in the above-listed patents filings of the inventor may still fall within the scope of the current invention and all related equivalent functions or replacement parts also should fall within the current invention's scope.

The current invention relates to a wire arrangement for hand-reachable desktop "USB charger related products." The term USB charger related products in turn relates to products that at least have one USB charger with its receiving kits and any combination of additional market-available electric or electronic parts and accessories to form a single or plurality of function(s) device that can be placed on a desktop to offer people convenience without bending the body or knee to connect a device for charging.

BRIEF DRAWINGS

FIGS. 1, 3B, and 3D are isometric views of a first preferred embodiment of the invention, which includes a wire arrangement for plug-in LED night light has at least one LED(s) and USB port(s) and optional outlet(s) related products.

FIG. 2 includes isometric views of second and third preferred embodiments of the invention, which includes a wire arrangement for a desk top hand-reachable USB device.

FIGS. 3A and 3C are end views of added-on or built-in the embodiment of FIGS. 1, 3B, and 3D.

FIGS. 4, 4A, 4B is an isometric view of a fourth preferred embodiment, which includes a power-wire arrangement for a desktop hand-reachable USB device embodiment that has (1) a built-in USB charger with 2 USB-port(s) powered by outside AC-plug wire to supply AC power to internal AC-to-DC circuit, or (2) USB device has plurality of linkable or connectable separated USB-unit(s) from power source main-wire(s) to more than one of branch-wire(s) for each separated USB-unit(s) while USB device without outlets.

FIG. 4A shown the co-pending Ser. No. 13/117,277 (hereafter as #FFF-2011) FIG. 16 item (I) has one input DC power source through the power source output main-wire and plurality of branch-wire(s) for plurality of separated USB-unit(s) with preferred distance away from each other.

FIG. 4B show one USB device has output main-wire to split into plurality of branch wires to connect or link with plurality of separated individual housing USB-unit(s) to supply more than one location having USB-unit(s) to let people buy one desktop items, reading light, accent light, time related products, air flow related products, essential oil diffusor, fan device or any combination of these items; have plurality USB-unit(s) arrange on different location(s).

FIGS. 5, 5A, 5B, 5C show one of preferred desktop USB device only has USB-port(s) without outlet(s) so can supply input DC from external transformer (hereafter as TRF). The current output from transformer already changed the home AC power to DC power with predetermined input DC power and distribute to number of USB-port(s) which is build-in USB-device(s) and this USB device only have device-housing without linkable or connectable plurality of separated USB-unit(s) away with others. Which also shown wire storage-arrangement which includes construction parts to form a space, gap, or dimension to allow application of simple physics and mechanical theory to arrange a wire by twisting a top cover to wind r release the wire when people sit at the desk and charge thelf other electric devices by a hand-reachable USB charger or outlet, the wire arrangement being situated on the bottom of the USB charger related unit or product using an overlay so that there is no need to take up any extra space on the desktop.

FIG. 6, are isometric views of a fifth preferred embodiment of the invention, the desktop USB device has outlet(s) so only can powered by AC-plug wire and input AC power into and connect with built-in at least one of AC-to-DC circuit, IC, LED(s), wired or wireless control system, wi-fi or Z-way or ZigBee or Blue-tooth wireless system; to set, adjust, change, control at least one of (1) LED light effects, (2) color, (3) brightness, (4) other function(s) or effect(s).

FIGS. 6A, 6B, show are isometric views of a sixth preferred embodiment of the invention, the said desktop USB device is one desktop USB power station and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items.

FIGS. 5P, 3P, 4P, and FIG. 6B show are isometric views of a seventh preferred embodiment of the invention, the said USB device is one of power strip or extension cord and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items. Wherein, the FIGS. 5P, 3P, 2P is inventor parent filed case U.S. application Ser. No. 12/938,628 (hereafter as #UU-2010) and U.S. application Ser. No. 12/232,035 (hereafter as #BB-2008).

FIGS. 4PP, 3PP, 23PP, 25PP, 14PP, 29PP, 26PP and FIGS. 6B, 6B1 are isometric views of a eighth preferred embodiment of the invention, the said USB device is one of desktop items, desktop reading light, desktop accent light, desktop LED or LCD display time related products, desktop light with built-in air-flow device or bladeless fan device, desktop essential oil diffusor, desktop project light, desktop reading or accent light has time/date/week/temperatures displayer products with USB charger; and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items. Wherein, the FIGS. 4PP, 3PP, 23PP, 25PP, 14PP, 29PP, 26PP is inventor co-pending or issued or earlier filed parent case(s) U.S. application Ser. No. 12/938,628 (hereafter as #GGG-2011) and U.S. Pat. No. 8,783,936 (hereafter as #GGG-2011) and U.S. application Ser. No. 13/847,447 (hereafter as #UUU-2013) and U.S. application Ser. No. 12 (hereafter as #FFF-2011).

FIGS. 14P, 13P show the traditional extension cord or power strip has preferred number of outlets with power or surge on-off LED indicator light with additional DC power section which has built-in AC-to-DC circuit to change outlet(s) AC current on buss bar to DC power to output through extension cord or power strip output main-wire(s) to at least one of branch-wire(s) to deliver the DC power to each separated away USB-unit(s). Each of separated and distance away USB-unit has preferred functional or decorative or treatment or finish as inventor parent filed case (#UUU-2) (#UUU-1) (#GGG-more than dozen family filed cases).

FIG. 7 and FIG. 7A are isometric views of a ninth preferred embodiment for storage-wire arrangement which has a twister-kits that uses a rotatable top cover to coil or release a wire to or from a space, gap, room, or compartment in the wire arrangement, the wire having a predetermined desired wire length and wire gauge.

FIGS. 8A-8C, 9A-9E, 10A-10B, 11A-11B, and 12A-12B are isometric views of a different USB charger and USB Charger related products having a built-in wire arrangement, the USB charger related products incorporating at least one device selected from a USB charger device, outlet device(s), LED light device(s), time piece device(s), motion sensor device(s), remote control device(s), smell device(s), motion device(s), animation device(s), audio device(s), video device(s), Internet device(s), digital data device(s) or other electric or electronic device(s) available from marketplace to provide a more-than-one-function product.

While FIGS. 1 to 12B show concepts of the current invention, it will be appreciated that any similar concept or equivalent application with a same purpose or that is based on a same physics theory or knowledge may still fall within the invention's scope or claim coverage.

FIGS. 12A and 12B show some preferred attachment kits to install the said (1) Desk top USB device, USB unit, Power strip, extension cord on preferred locations for indoor and outdoor applications.

DETAILED DESCRIPTION

Basing This application is CIP or Division for co-pending filing for

U.S. application Ser. No. 14/951,872 (hereafter as #GGG-10), which is CIP filing of U.S. application Ser. No. 14/870,601 (hereafter as #GGG-9), which is CIP filing of U.S. application Ser. No. 14/834,613 (hereafter as #GGG-8), which is CIP filing of U.S. application Ser. No. 14/834,823 (hereafter as #GGG-7), which is CIP filing of U.S. application Ser. No. 14/834,557 (hereafter as #GGG-6), which is CIP filing of U.S. application Ser. No. 14/858,538 (hereafter as #GGG-5-1), which is CIP filing of U.S. application Ser. No. 14/839,935 (hereafter as #GGG-5), which is CIP filing of U.S. application Ser. No. 14/827,810 (hereafter as #GGG-4C), which is CIP filing of U.S. application Ser. No. 14/189,062 (hereafter as #GGG-4), which is CIP filing of U.S. application Ser. No. 14/643,026 (hereafter as #GGG-3C), which is CIP filing of U.S. application Ser. No. 14/548,620 (hereafter as #GGG-2C), which is CIP filing of U.S. application Ser. No. 14/548,561 (hereafter as #GGG-1-C), which is CIP filing of US U.S. application Ser. No. 14/189,062 (hereafter as #GGG-3), which is CIP filing of U.S. Pat. No. 8,911,137 (hereafter as #GGG-2), which is CIP filing of U.S. Pat. No. 8,915,608 (hereafter as #GGG-1), which is CIP filing of U.S. Pat. No. 8,783,936 (hereafter as #GGG-2011) family has all details discussion for the USB charging port features and method to making same.

This filing is Continue of filing of below 2 co-pending filing case

U.S. application Ser. No. 13/161,643 filed Jun. 16, 2011 (hereafter as #GGG-2011) &

U.S. application Ser. No. 13/117,227 filed on May 27, 2011 (hereafter as #FFF-2011).

U.S. application Ser. No. 15/899,492 filed on Feb. 20, 2018 (hereafter as #UUU-2) which is CIP of U.S. application Ser. No. 15/340,367 filed on Nov. 1, 2016 (hereafter as #UUU-1) which is CIP of U.S. application Ser. No. 13/870,447 filed on Apr. 25, 2013 (hereafter as #UUU-2013) which is CIP of U.S. application Ser. No. 13/117,227 filed on May 27, 2011 (hereafter as #FFF-2011) and U.S. application Ser. No. 13/161,643 filed on Jun. 16, 2011 (# hereafter as #GGG-2011) which is CIP of U.S. application Ser. No. 12/938,628 filed on Nov. 3, 2010 (hereafter as #UU-2010).

The current invention is related to the wire arrangement for a USB charger device disclosed in co-pending U.S. application Ser. No. 13/858,604, filed Apr. 8, 2013 (hereafter as #RRR).

The current invention is related to the power station having built-in LED units and a USB charger disclosed in co-pending U.S. patent application Ser. No. 13/863,073, filed on Apr. 15, 2013 (hereafter as #SSS).

The current invention is related to the power station having built-in LED units and a USB charger disclosed in co-pending U.S. patent application Ser. No. 13/870,253, filed on Apr. 25, 2013 (Now is U.S. Pat. No. 9,559,471) (hereafter as #TTT).

The current invention is related to the wire arrangement for a USB charger device disclosed in co-pending U.S. patent application Ser. No. 13/858,604, filed Apr. 8, 2013.

The current invention is related to the power station having built-in LED units and a USB charger disclosed in co-pending U.S. patent application Ser. No. 13/863,073, filed Apr. 15, 2013.

From above list the (#GGG) and (#FFF) and (#RRR) and (#SSS) and (#TTT) these co-pending and earlier filed parent filing cases, already had very details description for how to work for the USB Outlet and Outlet device. It appreciated all the co-pending or earlier filed family filed cases all the concept, text, drawing, spirits, claims, drawing, illustration should still fall within the current invention and co-pending and patents claims scopes.

Further, the current invention also related to the outlets incorporate with USB port so all the above listed (#HHH-2011) (#RR-2010) and others earlier and still pending case (#UU-2010) should be still be treated as parent filing case and this invention should be continuously filing case for above list (#UU-2010) (#RR-2010) (#HHH-2011).

FIG. 1 shows a wire arrangement for plug-in LED night light has at least one LED(s) and USB port(s) and optional outlet(s) related products or for a USB charger. The said Plug-in LED night is fit within the built-in or added on storage-wire arrangement (1) and said LED night light (not shown) has at least one LED(s) to offer area or status indicator light as inventor parent filed case(s). The said built-in or added-on wire-storage arrangement have at least one hold-means (1) with cut-outs (2), as illustrated in greater detail in FIGS. 3A to 3D. In this arrangement, a wire (3) is positioned in a continuous groove (4) and exits the arrangement through cut-outs (2).

The desk top USB charger may include any combination of a USB-charger(s), outlet(s), LED-unit(s), sensor means, switch means, remote-means(s), motion means, and/or other electric device(s).

FIG. 2 shows a USB charger having 3 AC outlets 6 side-by-side and 2 sets of 2 USB charging ports 2 with a wire arrangement means inside the base (8) to be installed on a desk's surface(s) at a hand-reachable location(s).

FIG. 2 also shows a second embodiment having (4) outlets (10) and 3 USB-charging ports (11) with a wire-arrangement in the base (8) to adjust the wire length as needed from the base to power source, so that even heavy gauge wire will not make a mess when installed on the desk surface, so people can connect equipment with a charger or power source without the need to bend the body because the charger or power source is on the desk top at a hand-reachable location that is most convenient rather than at a lower location or on the floor, which will harm an aged person's waist and knee to cause thousands or hundreds of thousands of dollars for medical surgery.

As shown in FIGS. 3A, 3B, 3C, and 3C, at least one of the output openings or cut-outs (2) for the wire (3) can be cut-out at an angle, as indicated by reference numeral (2') in FIGS. 3A, 3B, and 3D, so that the wire will not be bent at too great an angle and thereby prevent damage to the wire's inner conductive means. The angle for the cut-outs can each be 60 degrees or 30 degrees depending on requirements. The cut-outs can extend from the edge to inner walls so as to let people hold the wire at any location along a continuous groove, ditch, or channel at any near-by cut-out location.

As shown in FIG. 3B, the walls can have any number of cut-outs (2) or (2') at the output-end at any location along the continuous groove, ditch, channel, or gaps (4) to allow the wire to come out at any location preferred by people. The narrow cutout's output-end can tightly hold a USB wire with a desired angle so that no harm occurs to the USB wire. The FIG. 3-2 shows only the USB-plug (14) of the USB wire, the other end being connected to a device such as an iPhone, HTC phone, Samsung phone, China mobile phone, flat-panel device, computer device, audio device, video device, or any other USB chargeable device. The ditch, groove, or channel (4) is preferably a continuous arrangement so that sections of the wire (3) do not overlay each other. If the wire arrangement means is not a continuous design, the wire will overlay or underlay when people coil it. However, this over lay or underlay will still fall within the current invention scope. In addition, the wire arrangement means can be made of a soft gel, in which case it can be fitted over a USE-charger so that the charger is positioned with a central compartment 15 within the wire arrangement, and the continuous groove (4) and cutouts (2) or (2') can be dimensioned to tightly hold the wire in place.

FIG. 4 shows a device having only 2 USB ports (16) without an AC power source outlet(s), so that can be powered by at least one (1) AC-plug wire to get AC power and connect device built-in AC-to-DC circuit, or
(2) External AC-to-DC transformer, or
(3) External DC power source by small gauge USB wire or conductive wire;

FIG. 4 show one of preferred USB device has AC-plug (17) power input wire (174) to supply AC power to the USB-charger. This kind of USB charger may be installed on a desktop or other surface at a hand-reachable location using traditional attachment kits such as glue, double sided tape, Velcro tape, catches, hooks, screws, a suction cup, magnetic-means, catch-means, hold-kits, heavy-unit(s), catch-holder sets, or any other attachment kits or fixing-sets; to enable easy use of the USB charger within the hand reachable distance such as desktop or table wall or table legs or bed walls or bed legs.

While the USB device has any number of built-in AC outlet(s), it needs to use heavy duty electric cord such as #14 gauge and very good attachment device or kits so can hold the USB device having outlets on the desktop or other surface. The good attachment enough to overcome the very heavy weight of the #14-gauge wire. The USB device may has storage-wire arrangement to hold, store, coil, receive, release, pull, twist, extend, fold, and/or retract a wire by a spring, elastic, roller, or rotating means to cause the wire to be well arranged to achieve pre-designed requirements, performance, functions, or effects. Same as storage wire-arrangement, the device optional having at least one (a) space or construction or electric system to arrange be-charged products fit within the space of USB device, or (b) space to offer be-charged product can be charged by wireless charging system.

FIGS. 4A and 4B, show the co-pending filed case U.S. application Ser. No. 13/117,227 (hereafter as #FFF-2011) FIG. 16 items G, H, I shown, the one USB device has more than one of separated USB-unit(s) (161) and each separated USB-unit(s) (161) powered by external DC power source by at least one of power source which may selected one from;

(aa) From FIG. 4B, DC power from branch-wires (175) (176) which connected with USB device output main-wire (174) shown on drawing wires, it also shown on FIG. 4A Item by USB-plug (160), or From FIG. 4B show the DC power source is one of USB male-plug (172) connect to DC power source (not shown) which may be a DC storage device or DC generation or DC Power bank or computer have female Type A or Type C or other type port(s), and through the output main-wire (174) and branch-wires (175) (176) to deliver DC power to each USB-Unit(s) (18) each having preferred length of branch-wire(s) to make preferred distance to deliver DC power to at least two USB-unit(s) located at different and space away locations.

(bb) DC power from branch-wires (175) (176) as shown on FIG. 4B drawing wires or two branch-wire (160) of FIG. 4A Item I. The more details shown on FIG. 4B DC power is from external transformer (171) output main-wire (174) through the output main-wire (174) and go through connected branch-wires (175) (176) to each separated USB-unit(s) (18).

(cc) DC power from branch-wires (175) (176) and main output-wire (174) from AC-to-DC circuit (713) built-in of desktop power station.

Any one of above (aa) (bb) (cc) to supply more than one of USB-unit(s) (18) which separated with others USB-unit(s) and each of separated USB-unit(s) has its own branch-wire (175) (176) to connect with the power source output main-wire (174) which is one of
(1) Plug-in wall transformer (171), or
(2) external DC power source (not shown),
(3) Main power station (18M) has built-in AC-to-DC circuit (173) to output pre-determined DC power to at least one of USB-port(s) (16) built-in numbers of separated and distance away USB-unit(s) (18) which get power by branch-wire(s) (175) (176) with or without connector, quickly connectors, wired kits.

Furthermore, From FIG. 4B shown more than one of separated USB-unit(s) (18) of USB device or power station system (18M). The output main-wire (174) and branch-wire(s) (175) (176) is one of (aa) DC power from branch-wires (175) (176) and output main-wire (174) having USB-plug (172), or (bb) DC power from branch-wires (175) (176) output main-wire (174) is from external AC-to-DC circuit or transformer (172 or TRF), or (cc) DC power from branch-wires (175) (176) and output main-wire (174) from AC-to-DC circuit (173) built-in of USB device or power station (18M).

From FIG. 4B also show all main-wire or branch-wire no need use #14 gauge AC wire because it only carry the DC current, so for the Desktop or floor lighting or USB device without AC-outlet(s) it can use #18 gauge wire so can save a lot of cost.

It is appreciated all these power-wire arrangements including output main-wire and plurality of branch-wire(s) with preferred length; these power-wire(s) arrangement only for one USB device or power station, so the current invention only need one USB device or power station can supply DC power to many individual USB-unit(s) to put on many different locations to save people money.

The said plurality separated individual USB-units has its preferred length so can have one power station on living room and put separated individual USB-unit(s) on different desk or bed side wall, side bed table, bed frame, couch, floor lamp surface, pole, bar, stand, or seat to offer person to charge their i-phone or i-pad as the earlier (#FFF-2011) FIG. 4A shown the more than one USB-unit(s) (18) connect with USB-plug (172) or external transformer (171) or AC-plug USB device or power station (173) built-in AC-to-DC and other circuit (173).

It is appreciated all the other US prior arts which filed before 2010 is not able to supply USB output current higher than 1.0 Amp because USB 3.0 which can supply bigger current up to 2 Amp announced on 2010 as above listed inventor parent filed case details description for Wikipedia reports of (#GGG-5) (#GGG-6) (#GGG-7) (#GGG-8) (#GGG-9) (#GGG-11).

Also, i-phone and i-pad applied Type A to get power and input DC power from Micro-USB, Type C is start from 2012 for i-phone 5 on 2012.

Majority US prior arts for power station or desktop items has the built-in USB charger which all built-in USB charger is one of male-plug to directly insert the MALE plug into the be-charge products FEMALE receiving port(s) before 2012. This is totally different with current invention the USB device has FEMALE RECEIVING PORT(s) to receiving MALE-PLUG of SEPARATED USB-JUMP-WIRE HAVING AT LEAST TWO MALE-PLUGS. Furthermore, even i-phone 1 to 4 the phone receiving-port is one of 30 pins female receiving-port, and other phone use different female receiving port(s). Hence, any patent filed before 2010 belong to none proper US prior art VS. the current invention (#FFF-2011) and (#GGG-2011) filed case products has FEMALE receiving port(s) which is male-plug of TYPE A of external outside one end of USB-wire. Other at least one of male USB-plug is one of micro-USB, or others which matching the be-charged products female receiving port(s).

FIG. 5 shows one of preferred USB device having wire-storage arrangement and 3 USB ports in a flat and thin USB device, the AC power input wire (172) being coiled or wrapped under the bottom of the round flat and thin USB charger unit. The round flat and thin unit can be put under base of another existing desktop device, such as a desk-lamp base, coffee cup base, coffee machine base, ashtray base, beverage cup base, phone base, calculator base, medicine bottle base, or other bottle or container base so that the round flat and thin USB charger will not occupy a new space to take away from the limited desk top space. The wire can be coiled or wrapped under the USB-charger unit base, within the housing, or within the walls as described below. The wire arrangement means may have parts and accessories to hold store, coil, receive, release, pull, twist, extend, fold, or retract the wire by a spring, elastic, roller or rotating means to cause the wire or receiving-end(s) of the wire to be well arranged for use in connection with pre-designed requirements, performances, functions, or effects. Since the USE-charger related products do not have AC outlets, LED-units, or other electric function devices built-in, the input AC power wire can be smaller than required for an AC power outlet device.

As shown in FIGS. 5, 5A show top and bottom view of one preferred power-wire and storage-wire arrangement USB device, the device have a round and thin housing (20) with two Type-A USB ports (25) with a central island-shaped wire arrangement mechanism (21), which can easily coil or wrap the power source main-wire within a space, gap room, or compartment (22). The island-shaped wire arrangement mechanism located on bottom of device to stop the wire from falling out from the space, gap, room, or compartment (22). The island-shaped wire arrangement mechanism allows the wire's length to easily be seen when the wire is inside the space. The output-end of the wire arrangement means has a cutout (24), so enable the flat and thin USB-charger or USB-unit to be installed on any surface.

The USB charger or USB device has built-in outlet(s) or USB-charger and another function device(s) may be round or have any desired geometric shape without departing from the scope of the current invention. Because the USB-charger or USB device related products of FIGS. 5 and 5A only has USB ports (25) without other outlets, LED-units, or other electric function devices, the built-in AC input power wire can be smaller than required for a device with AC output power requirements.

As shown in FIG. 5B, the storage-wire arrangement on the bottom of unit includes a center pole 26 around which the wire is coiled or wrapped, and a built-in three island-shaped mechanism's cover or roof 23 to stop power source main-wire 171 from falling from base. A wire output-end with cut-outs (24) has a hold-function to hold the wire in position. The USB device or USB charger has a predetermined built-in heavy weight, suction cup, magnetic means, double sided foam tape, Velcro tape, screw, base, or other attachment or fixing-means to secure the round flat and thin USB charger unit in a position without being moved and make a nice and neat wire-storage arrangement from an AC power source to supply a desired current from 1.0 A up to 50 A or more from the USB-ports (25), which is not possible to obtain from any existing device such as a laptop computer's USB ports, whose USB belong to USB 2.0 not USB 3.0 standard so before 2010 all USB charger or USB device can only supply 0.5 A or a maximum of below 1.0 A current. The current invention's USB charger can have a higher output of more than 1.0 Amp up to 50 Amps or more depending on market requirements. Because the USB-charger or USB-device related product of FIG. 5B only has USB ports (25) and no AC outlets, LED-units, or other electric function device(s) built-in, so the USB device no need to get the AC-plug to get AC current with very expensive #14 gauge wire. The USB device only have USB-port(s) the input wire can use #18 gauge which smaller than would be required for USB device have built-in AC outlets or AC devices with higher power requirements were included. And #14 gauge AC wire is a super expensive cost.

FIG. 5C shows the preferred USB-charger or USB device in the form of a round-flat unit which can underlay any existing desktop items or device, and this arrangement have to have a flat top surface so this underlay arrangement does not need to occupy any additional desktop space. As shown in FIG. 5C, the USB-charger related product only has USB ports (25) without any additional outlets, LED-units, or other electric function device(s), so the USB device (20) can incorporated with external transformer (TRF) to supply DC power through output main-wire (171) which less expensive than AC outlet device needed #14 gauge wire.

FIG. 6A, shows one preferred embodiment has a geometrically shaped YSB device or USB charger having both USB-ports (29) and built-in AC outlets (28) which is different with earlier FIGS. 4, 4B, 5, 5A, 5B, 5C only have USB-port(s), so FIG. 6 need a heavy duty electric cord. The heavy #14 gauge wire its cord's weight very heavy to pull on and move the unit in the absence of attachment means to fix the unit at a desired location. The attachment means may include a heavy weight, magnetic means, glue, double sided foam tape, screws, a catch-n-hook fastener, Velcro means, or other market-available skills or materials as FIG. 12A show some of preferred attachment kit(s).

From FIGS. 6 and 6B show the current invention for Desktop or floor light or USB device which has built-in AC-outlet(s) so it need get AC power from the AC-Plug Wire which is very heavy and very costly, so the current invention use a very short length for this expensive wire such as only 1 to 2 feet which is enough to let device connect with home wall outlet and lay on the ground or lower position. But, use a very long #18 gauge wire from the said Desktop or floor light device or USB device so can let USB-unit(s) to put on room at least one on desktop or floor+ one on side-bed table, or one on bed-wall, or one on bed-frame, or one on bed-legs, or one on anywhere; These desktop or floor lighting or USB-device or extension cord can fix or attached or install on the anywhere while people use FIG. 12 preferred attachment kits. The FIG. 12 attachment kits also have details discussion on following drawings.

The geometrically shaped unit is illustrated as a FIG. 6, the round flat and thin unit having interior magnetic and heavy weight pieces to overcome pulling force exerted by the heavy duty #14 gauge AC electric cord, which is required by some safety authorities to be #14 gauge, although the gauge may be variable based on safety requirements for different applications and countries. The preferred round flat and thin unit is designed to underlay any items put on top of it because it is thin, flat, and water resistant, and all receiving USB-ports or outlets ports are on a side with a nice slope so that anything can be put on top and there is no need for any new space on the desktop when using the current invention's unit, which may be (1) a simple USB charger with a small diameter electric wire such as #18 gauge as earlier FIGS. 4, 4B, 5, 5A, 5B, 5C, (2) a combination of a USB-charger and outlet unit need #14 gauge electric wire go through built-in AC-to-DC circuit, (3) a combination of a USB-charger, outlet unit, and LED-unit need #14 gauge electric wire go through built-in AC-to-DC circuit, or (4) a combination of units with more than three functions selected from any electric, electronic, or digital data device or internet devices functions.

FIGS. 6, 6A, 6B, 7, and 7A show some preferred embodiment of USB device (18M5) (18M6) or USB charger (18M5) (18M6) related products having USB ports (29) and AC outlets (28) optional have preferred numbers of LEDs or other electric function device(s) Such as co-pending or earlier filed case including (#GGG) (#UUU) family which cover any functional or decoration or geometric shape products, device, items within the said desk top items as (#GGG) and (#UUU) family details listed hereafter for quickly research the claims and scope and idea for any decorative or functions items within the USB charger or USB device is well protected by inventor parent co-pending and issued patents, including;

U.S. application Ser. No. 15/899,492 filed on Feb. 20, 2018 (hereafter as #UUU-2) which is CIP of U.S. application Ser. No. 15/340,367 filed on Nov. 1, 2016 (hereafter as #UUU-1) which is CIP of U.S. application Ser. No. 13/870,447 filed on Apr. 25, 2013 (hereafter as #UUU-2013) which is CIP of U.S. application Ser. No. 13/117,227 filed on May 27, 2011 (hereafter as #FFF-2011) and U.S. application Ser. No. 13/161,643 filed on Jun. 16, 2011 (# hereafter as #GGG-2011) which is CIP of U.S. application Ser. No. 12/938,628 filed on Nov. 3, 2010 (hereafter as #UU-2010).

The current invention also have drawings, claims to cover all USB device with or without IC, switch, control system, wireless system, Wi-Fi, Zigbee, Z-way, Blue tooth, RF or IR remote controller to make setting, adjusting, selection, changing the desired color, brightness, function(s), effects.

From FIG. 6 one of preferred USB device (18M5) having a built-in AC-plug with input power main-wire (17) which meets the AC outlet power wire requirements. And, inside the USB device optionally incorporates other at least one or more additional outlet device components selected from (i) surge or others protection, (ii) remote or wireless control system, (iii) LED area or status indicator illumination, (iv) a master power outlets (that controls all other outlets by causing the other outlets to follow the master), (v) sensor(s), (vi) remote controller, (vii) current leakage warning system, and (viii) auto shut off system to provide the outlets with greater safety and convenient performance.

FIG. 6A, shows one preferred embodiment of a round flat and thin USB device (18M6) or USB charger (18M6) related product which has 4 USB ports (29) and 4 outlets (28) as well as at least one built-in additional function device (not shown) selected from market-available electric, electronic, digital-data, communications, computer, or other devices. Basing on built-in not only USB port(s) (29) but also have AC-outlet(s) (28) and plurality of LED(s) (28a) offer at least one area or status indicator illumination, so the input power have to be AC power from AC-plug wire (17) and the input main-wire (71) into the USB device (18M6) to connect with AC outlet(s) (28) by conductive piece(s) which are individual or part of circuit (6AA). The circuit (6AA) not only supply AC power to built-in AC-outlet(s)(28). The circuit (6AA) has built-in AC-to-DC circuit for at least one of DC operated parts or items including (i) USB port(s) (29), (ii) LED(s) (28a), (iii) IC, (iv) electric parts and accessories, (v) charging status system, (vi) wireless control system, (vii) wireless receiving system, (viii) Wi-Fi system, (ix) ZigBee, Z-way, blue tooth system, (x) camera system, (xi) storage system or (xii) audio system, or (xiii) Video system, or (xiv) other system; needed predetermined wattage of DC power.

From 6A show the built-in circuit (6AA) have connect with at least one of branch-wires (175) (176) and each has preferred length to deliver the DC power under pre-determined watt or current amount to at least one of separated individual USB-unit(s) (FIG. 6B) and FIG. (6B1). Each USB-unit(s) (18c) (18d) has preferred number of USB port(s) (29) connect with the input branch-wire (175) (175) to get pre-determined input DC wattage to share or to each build-in USB-port(s). One of preferred embodiment, the input wattage or DC power is 2.4 Amp from one of branch wires, so can let preferred 2 USB-ports to share this 2.4 Amp current to charger be-charged products by external male-USB plug of USB jump wire. This branch-wire(s) for separated individual USB-unit(s) for USB-device or USB charger related products such as above listed parent filed (#GGG) (#UUU) (#FFF) (#UU) family including 1. (#GGG) for any desktop items or reading light, accent light, project light, lighted mirror, air-flow device, time display, digital alarm clock, liquid/smell/moistures dispensing equipment, essential diffusors, or other desktop items shown on following drawing and discussion FIGS. 4PP, 3PP, 23PP, 25Pp, 14PP, 29PP, 26PP.
2. (#UUU) for any desktop items with any decorative or functions device, items, finished, treatment for USB power station show on following drawing and discussion on parent filed case (#UUU-2)(#UUU-1) (#UUU-2013) those are CIP of (GGG).
3. (#UU) for any LED light bar, LED and outlet light bar, LED and outlet and USB light bar, LED and outlet and USB power strips or extension cord applications which show on following drawing and discussion FIGS. 5P, 3P, 4P and FIGS. 14P, 13P.

the current invention incorporated the power-wire arrangement including (1) main-wire(s) to connect with at least one of (2) branch-wire(s) for at least one of (3) separated individual USB-unit(s) which has at least one of (4) built-in USB-port(s) which with or without at least one of (5) decorative or functional items, device, products, finish, treatment for said USB-unit(s) or with or without the said preferred control system(s).

FIG. 6B also shows a preferred space for the USB-charger (18M6) and USB device (18M6) or USB-unit (18c) (18d) its body having space for wire-storage arrangement for round flat and thin unit (18M6) (not including the heavy AC electric cord and its plug-means). As above discussion, the separated individual more than one of USB unit(s) (18c) (18d) bottom have center bolt (30) and island-shape cover or roof (31) to allow wire(s) can coil around the center pole (30) without fall out. Also, the separated individual USB unit(s) (18c) (18d) also can have built-in other decorative or functional item, device, products, treatments, finish. One of preferred functional device is wireless charging system (29a) connect with preferred circuit(s) and powered by branch-wire (175) (176).

FIG. 6B also shows the USB-Unit(s) (18c) (18d) bottom construction for the bottom storage-wire arrangement which has a center pole (30) to hold an island-shaped stopper (31) to prevent the wire falling out from the USB-Unit(s) (18c) (18d) bottom built-in space, room, or compartment (32) that holds the wire when it is coiled or wrapped around the center pole (30) and which extends to a curved wall (23). In this embodiment each of USB-Unit(s) (18c) (18d) has 6 AC outlets (28) and 2 USB-ports (29) are preferably arranged within the bottom of the unit.

From inventor co-pending or parent filed case has FIGS. 5P, 3P, 4P show the extension cord (18M7) (18M8) (18M9) or power strips (18M7) (18M8) (18M9) as co-pending US application Ser. No. 13/117,277 filed on May 27, 2011 (hereafter as #FFF-2011) and U.S. application Ser. No. 12/938,628 filed on Nov. 3, 2010 (hereafter as #UU-2010) shown the extension cord (18M7) (18M8) (18M9) or power strips (18M7) (18M8) (18M9) having at least one 1. LED (34a) for power or surge (34a) on-off, 2. Outlet(s) (331R=Rotatable) (331F=Fixed), 3. USB (333) or any market only a. Outlet(s) (331R=Rotatable) (331F=Fixed) and b. LED(s) (34a) for power on-off or surge protection light (34a).

From FIG. 4P, the current invention added the quickly connector (336a) or directly wired (336a) for DC power output main-wire (174) with or without distribution kids (174a) to get the extension cord (18M9) (18M7) (18M8) or power strips (18M9) (18M7) (18M8) internal built-in AC-to-DC (not shown) pre-determined DC power through the output main-wire (174) to deliver to at least one of branch-wire(s) (175) (176) so can offer the pre-determined DC power to the each separated away and individual USB-unit(s) (18E) (18F) has DC power to supply power to the said at least one (A) USB-port(s) (29) and (B) optional wireless charging system (29a) to make at least one type of charging system for i-phone or i-pad or other communication or tablet device has Type A, Type C, micro USB, lighting USB system, or other has similar or equal function or replaceable adaptor and input ends, or USB-Jump-Wire(s) or other quickly connector system. The said USB-Unit(s) (18E) (18F) of FIG. 6B or FIG. 6B1. This is same as above discussed with or without the wireless charging system, or with or without the storage-wire arrangement is depend on market requirement. However, the said any USB-unit(s) (18E) (18F) or USB-device(s) (18M9) has any decorative or functional or treatment or finish powered by USB-wire (not shown), AC Plug-wire (336W), External transformer output main-wire (174) all should fall within the inventor's earlier filed and co-pending filed case U.S. application Ser. No. 15/899,492 filed on Feb. 20, 2018 (hereafter as #UUU-2) which is CIP of U.S. application Ser. No. 15/340,367 filed on Nov. 1, 2016 (hereafter as #UUU-1) which is CIP of U.S. application Ser. No. 13/870,447 filed on Apr. 25, 2013 (hereafter as #UUU-2013) which is CIP of U.S. application Ser. No. 13/117,227 filed on May 27, 2011 (hereafter as #FFF-2011) and U.S. application Ser. No. 13/161,643 filed on Jun. 16, 2011 (# hereafter as #GGG-2011) which is CIP of U.S. application Ser. No. 12/938,628 filed on Nov. 3, 2010 (hereafter as #UU-2010).

From FIG. 4P can see the AC plug-wire (336W) is very short which can be just same length for home outlet location to ground which approximately 30-45 cm (1 to 1.5 feet). So, the AC plug wire (336W) can only use Max. 45 cm (1.5 feet) can let extension cord (18M9) flat lay down on ground and AC-plug (336) can safety and never been pull out by its heavy weight AC-wire (226W). This super short AC wire length (336W) is not existing at marketplace. All marketplace at least 3 feet or 6 feet for power strip sold at DOLLAR CHAIN STORS. So, current invention made a big improvement to shorten the very expensive AC-wire (336W) to shortest length which enough to let power strip lay down ground. The power strip (18M9) use much longer cheap #18 gauge wire for output main-wire and branch wire(s) so can let laydown ground power strip (18M9) DC power delivery to not only one for desktop or floor light device or other electric device or USB device but also has plurality of separated USB-unit(s) can from same power strip DC output wires of #18 gauge to install desired number of USB-unit(s)

on anywhere including wall, legs, top surface(s) of room furniture(s), side-table, closet(s), cabinet(s), chair(s), bed-frame, bed-walls, bed-legs, working table, couch, sofa, seat by FIG. 12 preferred attachment kits.

FIG. 4P and FIGS. 14P, 14P had same concept to use most shortage length such as 45 cm (1.5 Feet) to save the very expensive and very heavy #14 gauge wire cost and let Power strip (18M9) and (18M13) to lay on ground, and use super long length of cheap #18 gauge or safety authorities approval #20, #22 or other # gauge wire to have at least one or plurality of separated distance away USB-unit(s) with build-in USB-port(s) on many different location where people work, rest, sleep, watch TV from one of the said Power strip (18M9 of FIG. 4P) or (18M13 of FIG. 13P, 14P). Hence, the current invention to make big improvement for market all power strip with build-in USB-port(s) on the power strip body which is bad idea because power strip need use #14 gauge wire so heavy so can not stay on desktop or top of any surface because (1) too heavy for #14 gauge wires and (2) too ugly for the power strip, and (3) Power strips received more than one AC operated products to add more #14 gauge wired weight so it only can lay on ground . . . however, The market all kind of power strip have built-in USB port(s) on extension cord in order to offer easily handle or plug-in AC-plug of be-supplier power device(s), so people add more length for #14 gauge AC-wire, so can not make cheaper cost. The current invention on contrary to reduce the length of #14\gauge AC-wire from Dollar Chain stores 6 feet to 1.5 feet to save money. Also, the current invention offers more than one or plurality of separated distance away many USB-port(s) is located on any locations people will stay, work, reading, rest, sleeping . . . . This is big improvement for all market extension cord and power strips still need bend the body to plug the USB-wire and only one location near the power strip less than 1 Meter (3 feet) because Apple all USB wire only is 1 meter 3 feet . . . . Hence, the current invention not only supply super low cost extension cord (because shorten #14 gauge wire to 1.5 feet) and also supply more than on separated location(s) and distance away for many USB-unit(s) having built-in USB-port from only one extension cord . . . This is Big improvement for all market extension cord. This is biggest improvement for market all extension cord as FIG. 4P (18M9) and FIGS. 14Pm 13P (18M13) shown.

FIGS. 4PP, 3PP, 23PP, 25Pp, 14PP, 29PP, 26PP show the co-pending and parent filed case for desktop item or desk top reading light or desk top accent light including the Reading light (18M10, 18M111 of FIG. 4PP), Accent light (18M11 and 18M12, and 18M13 of FIG. 3PP), Glitter or Lava or accent light with color changing by IC (18M12 and 18M13 of FIG. 23PP), Project or accent light (18M12 and 18M13 of FIG. 23PP and FIG. 25PP) IC control for color and brightness or dimmable switch or wireless controller control light device (FIG. 25PP), base of all kind of LED light (18M14 of FIG. 14PP) has multiple functions (FIG. 14PP), Clock (18M15 of FIG. 29PP) or Digital alarm clock (18M16 of FIG. 29PP) or desktop time related piece (18M16 of FIG. 129PP of FIG. 26PP), Accent light (18M16 of FIG. 129PP of FIG. 26PP) or pin-hole image project light (18M16 of FIG. 129PP of FIG. 26PP) or time related products (18M16 of FIG. 129PP of FIG. 26PP) or audio device with all kind of music, melody, rhythm, sound device (18M16 of FIG. 129PP of FIG. 26PP) incorporate the current output main-wire (174) through the direct wired or use all kind of connector, USB-plug and USB-Port, adaptor and receiving-ends to deliver the each above FIGS. 4PP, 3PP 23PP 25Pp, 14PP, 29PP, 26PP for all kind of desktop electric devices' (18M10 to 18M16) DC power to at least one of branch-wire(s) (175) (176) or more to the at least one of USB-Unit(s) (FIG. 6B and FIG. 6B1). From FIGS. 4PP, 3PP 23PP 25Pp, 14PP, 29PP, 26PP the details of the said (a) Desktop items connected with AC power source & built-in AC-to-DC circuit, or external transformer or external DC power source, (b) connector or directly wired the power output main-wire(s), (c) optional distribution kids, (d) at least one or plurality of branch-wire(s), (e) separated and distance away each of USB-unit(s), (f) with or without wireless or other decorative or functional items, device, unit on each of USB device (18M10) (18M11) (18M12) (18M13) (18M14) (18M15) (18M16) or USB-Unit(s)(18G) (18H), (g) with or without wireless charging system on USB device or USB-unit(s), (h) with or without Outlet(s), LED(s), other control system of USB device or USB-unit(s) (18G) (18H) as above discussed so not discus again.

FIGS. 14P, 13P show the market power strips or extension cord (18M17) has the AC plug (14-1) with preferred 2 wires (14-2) (14-3) or one #14 gauge AC wire (13-2) supply AC power into the power strip or extension cord (13-1) inner at least 2 electric (+) (−) (13/7) (13-8) and optional ground pole (13-9). The said extension cord (18M17) or (13-1) for current invention add one space to install at least one circuit(s) (13-9) which has at least one of (i) IC, (ii) Sensor(s), (iii) wi-fi system, (iv) Z-way system, (v) ZigBee system, (vi) RF or IR remote control system, (vii) wireless control system, (viii) AC-to-DC circuit to change input AC from the AC electric (+) (−) electric pole or buss piece into the circuit(s) (13-9) or into AC-to-DC circuit (171) to get DC power for DC operated device at least including (a) IC, (b) LEDs for power or surge or charging or status indicator light (13-4) or the LEDs on the separated and distance away USB-unit(s)(18I) (18J).

FIGS. 14P, 13P USB device (18M17) which connected with USB-Unit(s) (180 which has built-in at least one preferable device selected from above listed items. Here the preferred choice from LED(s) indicator light (133d) which has one window and insider has at least one of Red, Green, Blue LEDs (133d) to show the charging status for low-power, charging, fully charged. It also can have multiple windows, opening(s), holes to put single color LED(s) including one of each Red, Green, Blue (133e) to show the charging status and-or surge status and-or power-on/off status, furthermore basing inventor's parent co-pending or patented claim, the said USB-unit (18I) (18J) or USB device (18M17) to add any functional or decorative or treatment or polished or printing or painting all fall within the said inventor's earlier parent co-pending or patented claims or concept or idea or scope or constructions.

From FIGS. 14P and 13P which show same concept for above (A) FIGS. 4A and 4B;
(B) FIGS. 5P, 3P, 4P;
(C) FIGS. 4PP, 3PP, 23PP, 25Pp, FIGS. 14PP, 29PP, 26PP;
(D) FIGS. 14P, 13P:

FIG. 7 shows a central rotating to cause wire release or coiling back to the USB device or USB-unit, the construction of which includes:

(1) A top cover (35) installed with receiving means that include any desired combination of at least one USB-port (29), outlet, LED-unit, sensor means, motion sensor, remote control means, audio or video related means, digital data-means, internet related means, or other market-available electric or electronic means.

(2) At least one of the receiving-means wires (36) from the USB-port (29) and outlet or LED-units is connected to internal circuit-means and/or circuit means having a built-in PCB (46) PCB input-end (37) to connect with an electric power input wire (38). The PCB output-end (39) is connected to the wires (40) from the receiving-means. The circuit means uses the PCB (46) to connect the wires (40) from the receiving-means at the output-end (39) with the power source input wire (38) at the on input-end (37).

(3) The AC electric input power wire (38) is coiled or wrapped within the unit housing, for example by a rotatable inner-housing-wall (42) of a rotatable-means (43). And can be released or coiled by rotating a top ring (44) or part of the unit's housing. The preferred twisting-means may be a finger twister, which can have any design such as a pole, a holder, a concave finger holes, ribs, raised bars, or other twisting-means.

(4) At least one opening (45) is provided in the rotatable inner housing-wall (42) that contains the PCB (46) with the circuit means for converting input power into appropriate output power current and voltage. The opening (45) will rotate when the rotatable inner housing-wall (42) is rotated and cause the PCB input end's electric power wire (38) to be coiled or released from the opening (45) located on the rotatable inner housing-wall (42).

(5) As a result, the power input wire can be easily coiled or released from the power input wire output-end.

FIG. 7A shows further details of the arrangement of FIG. 7

FIGS. 8A, 8B, and 8C show an embodiment which has a built-in wire arrangement means on the base to coil and release a power wire(s) so as to achieve a nice and neat arrangement of the wire from the power source to the desk top and allow the USB-charger unit to be placed at a hand-reachable distance on the desktop for use in charging other electric, electronic, digital-data, image, audio, video, or other available devices from the marketplace without requiring the user to kneel down or bend in order to connect a device with the charger.

FIG. 8A shows a plurality of LED-units (50) for front illumination, and a plurality of LED units (51) for top-facing illumination and that light-transmitting items to be put on top of the LEDs to achieve different light performances. For example, a plastic beverage bottle with different colors can be placed on top of the LEDs to become a colorful lantern, or an ashtray can be used to provide a crystal light performance. The USB-charger can have any geometric shape such as a big round flat and thin shape that allows anything to be put top of it without occupying any extra desk space. The big round flat and thin unit can also have a nice surface finish such as a wooden, metalized, marble, stone, or antique brass finish to make the USB-charger become a very valuable item that people are more willing to put on a desk top. The USB-charger related product of FIG. 8A can have built-in USB-ports (29), outlets (28), and LED-units (50) or (51) only, without other electric function devices and a built-in AC power input wire which meet the outlet AC power wire standard.

As shown in FIG. 8C, the USB-charger product may include a motion sensor or remote controller receiver means (52) installed on a front of the desktop USB-charger device to make electric signal contact easier. FIG. 8C shows a USE-charger related product having built-in USE-ports, outlets, LED-units and other electric function devices. The inner housing of the USB-charger products of FIGS. 8A to 8C may also have a built-in spring or retract means and other wire arranging parts and accessories to hold, store, coil, receive, release, pull, twist, extend, fold, or retract a wire by spring, elastic, roller, or rotating means to cause the AC power wire or receiving-end(s) wire to be well arranged for use in consideration of pre-designed requirements, performances, functions, and effects.

FIGS. 9A, 9B 9C, 9D, 9E, 10A, 10B 11A, and 11B also show built-in wire arrangements on a base to coil or release a wire from a USB-charger unit having a desired combination of USE-ports, outlets, LED-units and an optional added function device(s) so that the USB charger unit offers three or more functions including USB and outlet power supply, and the at least one added function.

FIGS. 10A 10B show USB-charger related products having built-in USB-port(s), outlet(s), LED-unit(s) and other electric function device(s) for a total of more than three functions for the USB-charger related product, the said built-in AC power wire which is meet the Outlet AC Power wire standard. Furthermore, the USB charger related products may incorporate other devices (55) such as a motion sensor device, time device, remote control device, Infrared device, LED light device, integrated circuit (IC), color changing light, color selection light, power source is from outside DC power source use conductive wire to input USB device, control device, sensor device, power fail device, color changing status-indicator devices, controller device, smell device(s), motion device, audio device, video device, cable TV device, Internet device, or other market-available electric or electronic devices. The preferred embodiment may have a master outlet feature (57), outlets having a built-in surge protection circuit, or a built-in retraction or spring means (56) to cause a wire to extend and be received back by elastic force, the wire being arranged on the bottom or within the housing at a desired location, space, room, compartment, gap, or wall.

One of preferred USB device is power strip or extension cord which has main-wire and branch wires for main USB device and its branched USB-Unit(s) as above discussed by at least one of (a) Phone hook with poles (60) (61), (b) magnetic unit (66) and metal piece), (c) Velcro hook and loops (68), (d) screw, (e) glue or adhesive or chemical compound, or other market available fix or attachment kits.

Figure 1:
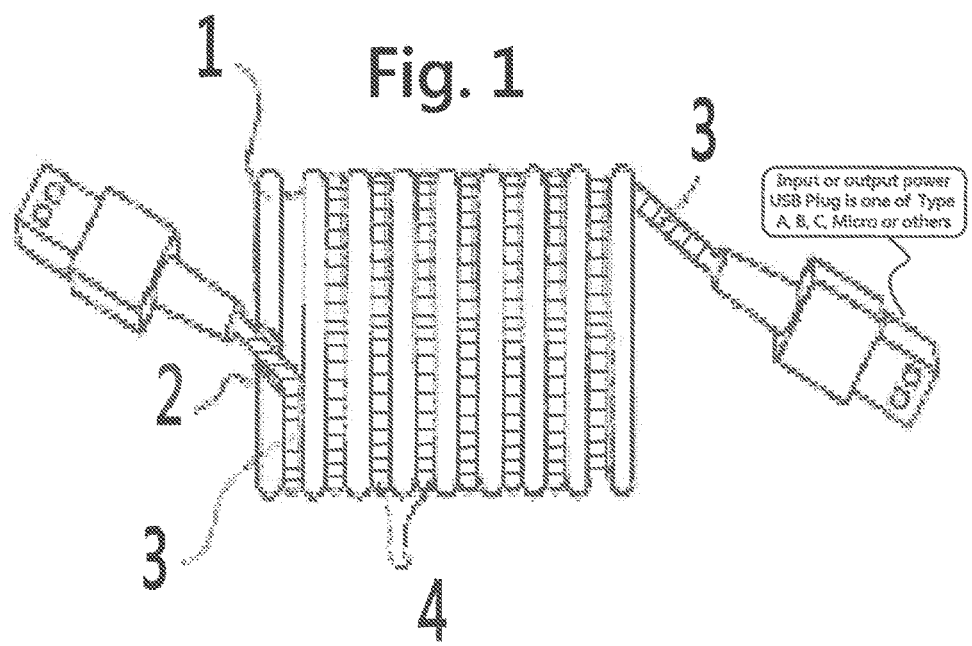
Figure 2:
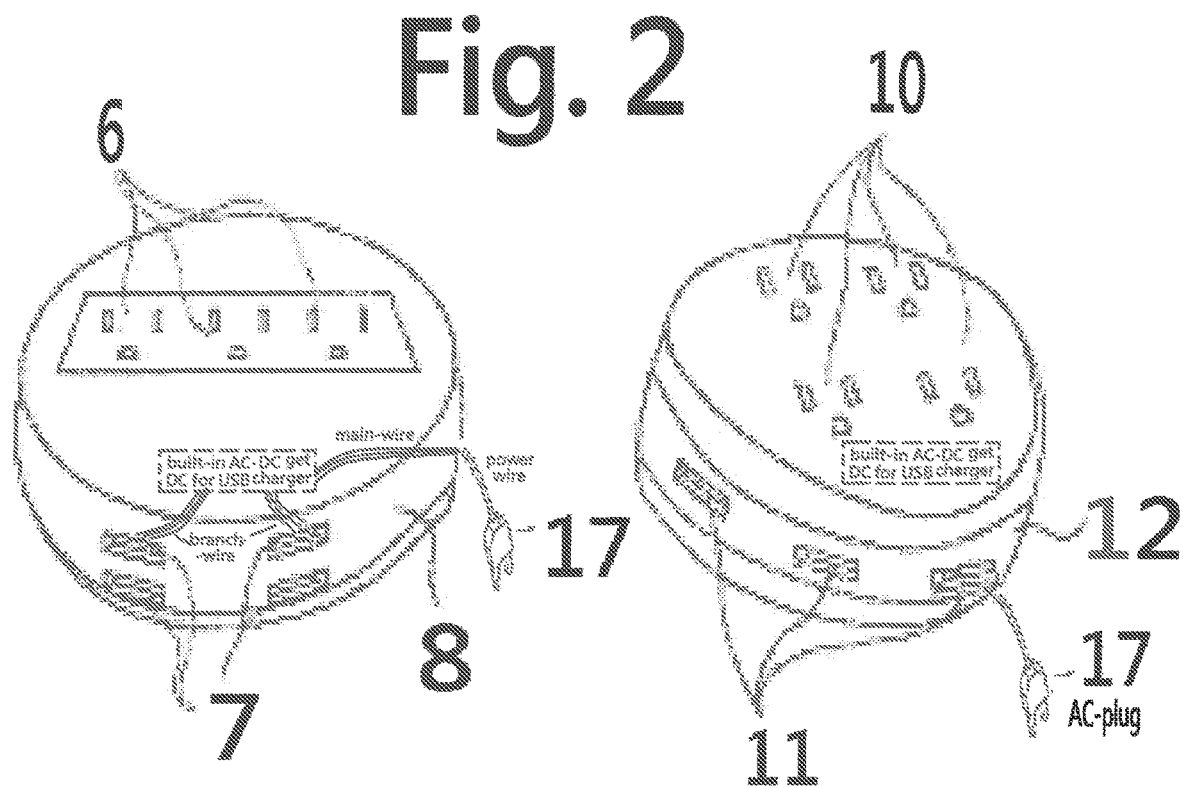
Figure 3A:
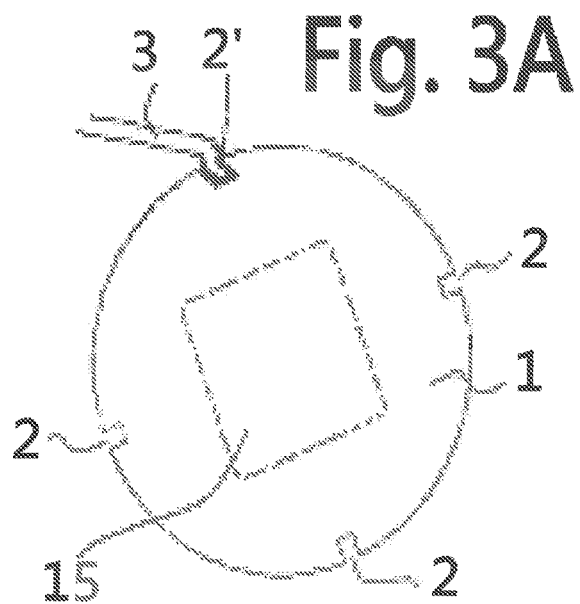
Figure 3B:
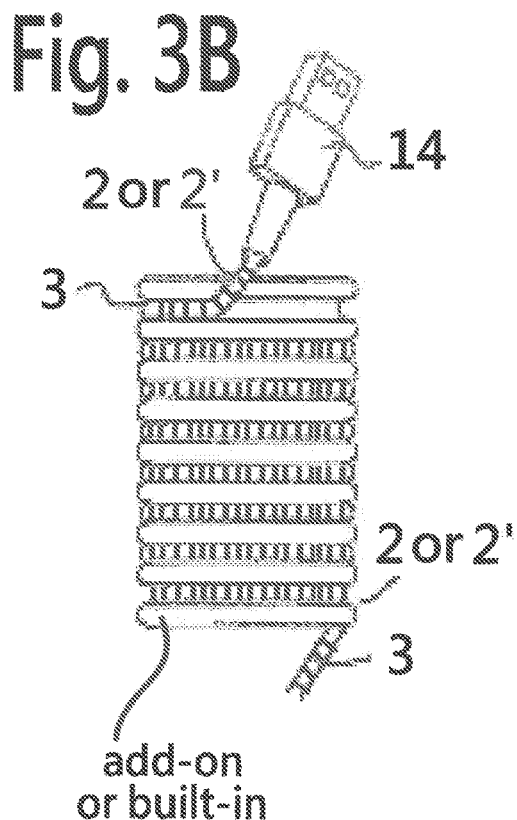
Figure 3C:
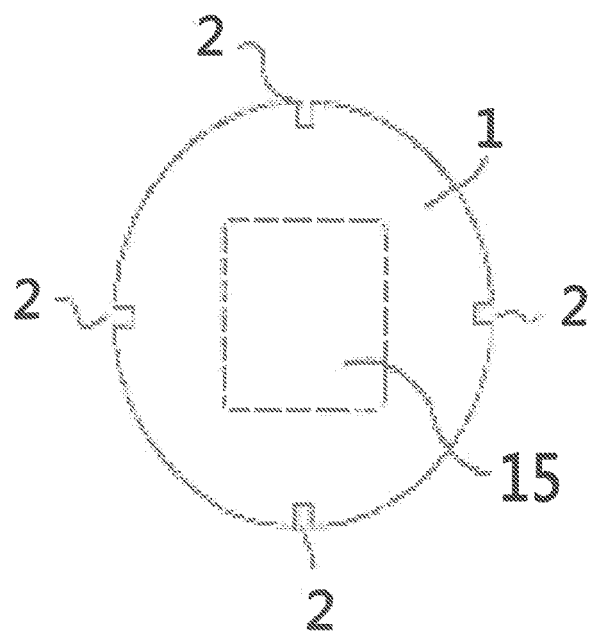
Figure 3D:
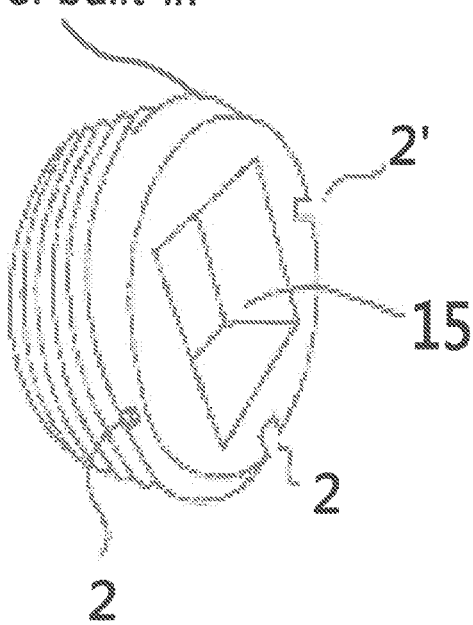
Figure 8A:
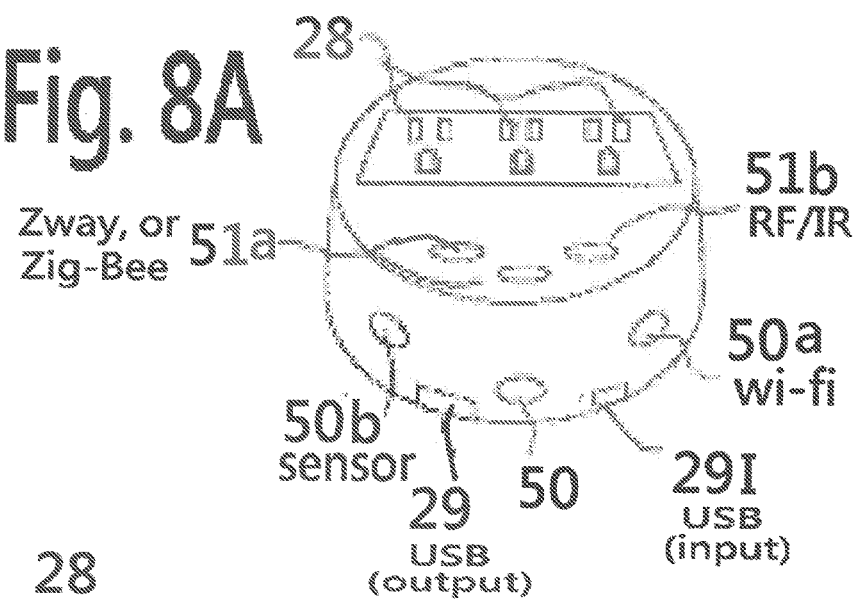
Figure 8B:
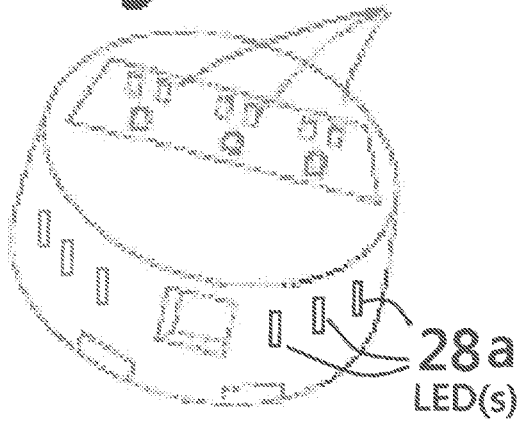
Figure 8C:
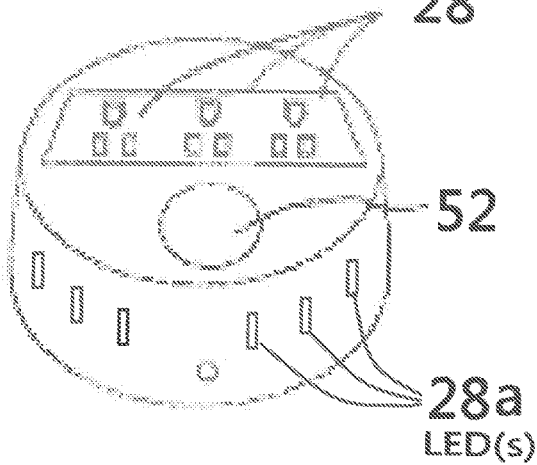
Figure 10A:
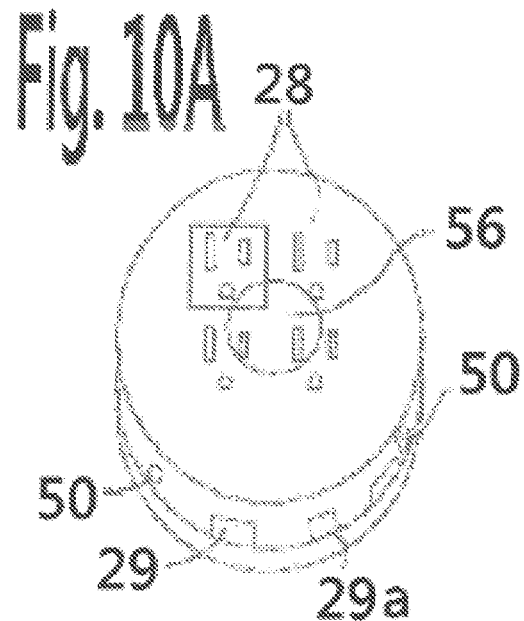
Figure 10B:
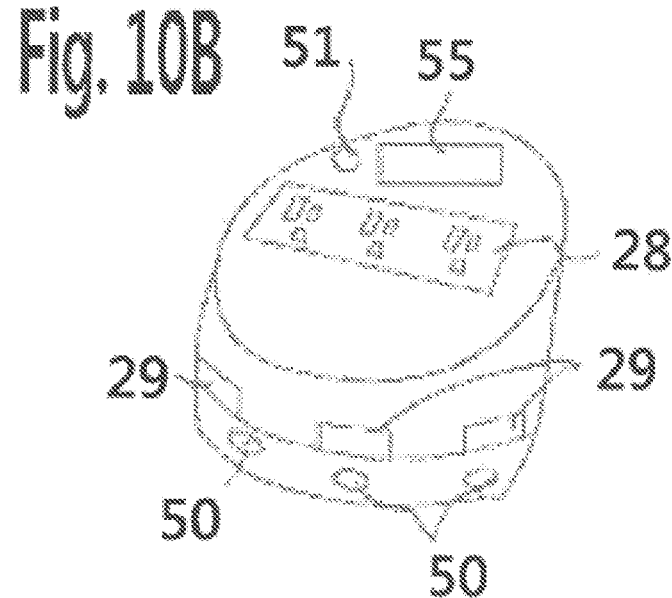
Figure 11A:
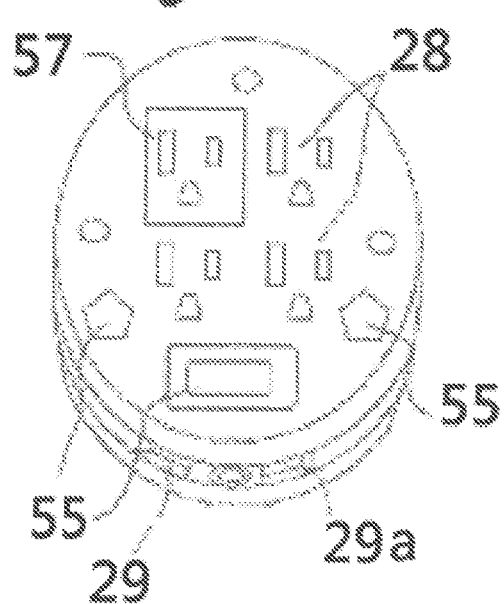
FIGS. 11A and 11B show different combinations of the above-listed added function devices suitable for inclusion in the hand-reachable desk top USE-charger related products of the current invention.
Figure 11B:
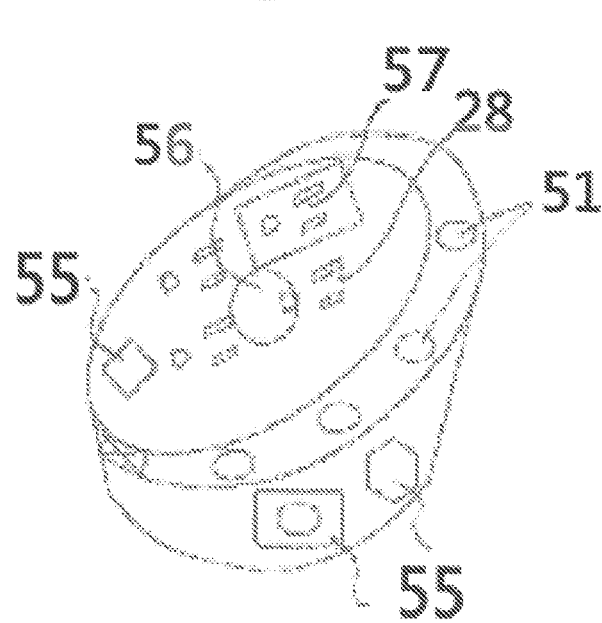
Figure 12A:
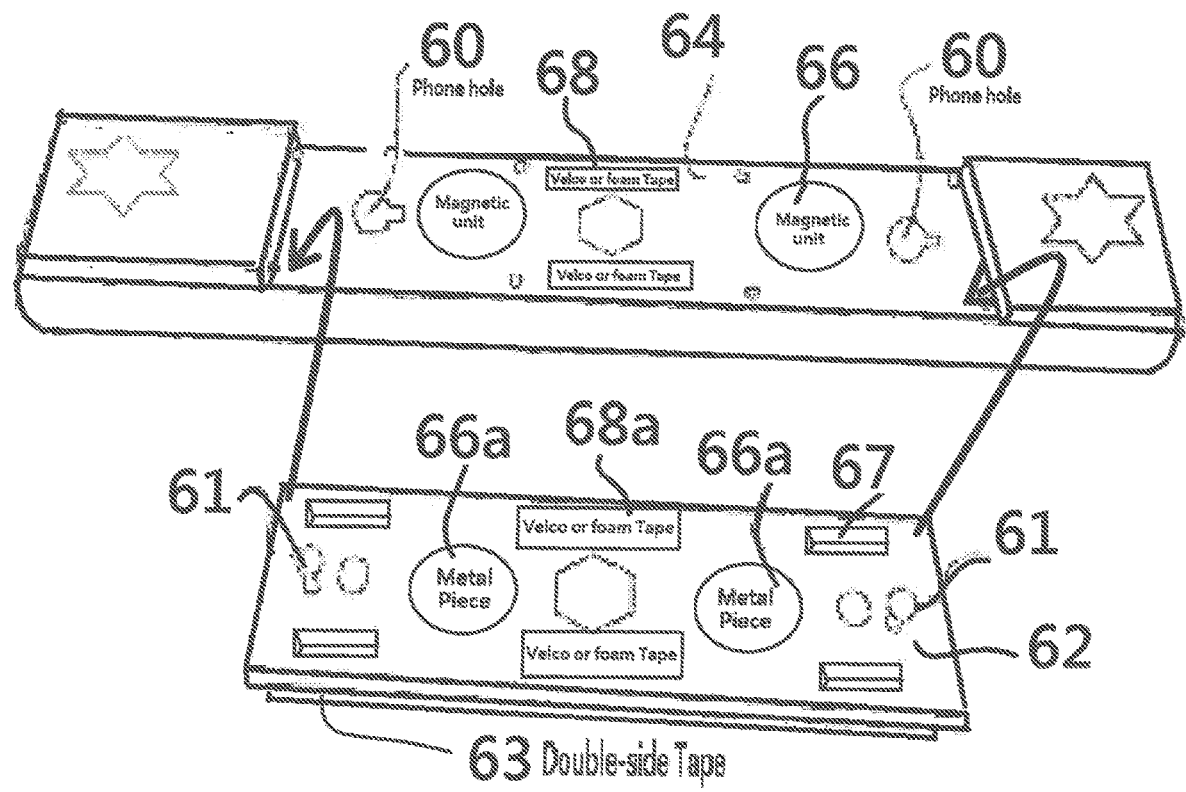
FIG. 12A shows a catch (60) and hook (61) of a holding arrangement that uses screws or double sided foam tape (63), or glue, chemical compound (not shown); for installing a first plate (62) on a surface, with the catch (60) and hook (61) being used to fasten the USB device or charger product (64) to the first plate (62), and thereby hold the USB-charger product (64) on the surface.
Figure 12B:
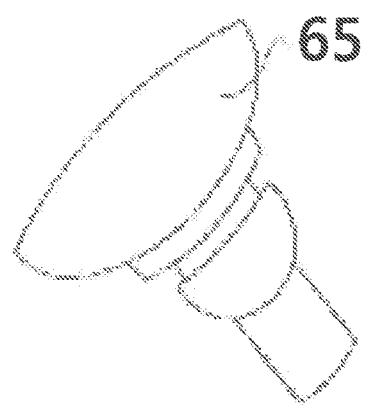

FIG. 12B shows a suction cup arrangement (65) installed within layers of the USB-charger product's housing to hold the product in position against force applied to the product.

From above some preferred drawings, text, concept including current invention and all above listed parent, co-pending, patented inventor filed cases text, idea, concept, construction, applications should still fall within the current invention claim scope without exemption.

Hereafter, list other (16) features basing on all above listed inventor co-pending, earlier filed, patented text, drawing, idea.

1. From FIGS. 5P, 4P, 3P and FIG. 14P, 13P shown
   A Power strip has separated and distance away UBS-unit (s), comprising;
   At least one AC Outlet(s) and status indicator light fit within the power strip At least one AC-to-DC circuit built-in power strip to change AC-plug wire input AC power to DC power and deliver pre-determined wattage DC from power strip power output end through at least one main-wire(s) to more than one of branch-wire(s) to desired number(s) of separated and distance away from power strip and others USB-unit(s).
2. A Power strip has separated and distance away UBS-unit(s) as discussion 1, at least one functional or decorative or treatment or finish item, device, products fit into at least one power strip or USB-unit(s).
3. A Power strip has separated and distance away UBS-unit(s) as discussion 1, power strip has at least one or more outlet incorporate with components or system selected from (i) surge or others protection, (ii) remote or wireless control system, (iii) LED area or status indicator illumination, (iv) a master power outlets (that controls all other outlets by causing the other outlets to follow the master), (v) sensor(s), (vi) remote controller, (vii) current leakage warning system, (viii) IC, (ix) wireless system, (x) wi-fi or Z-way or Zigbee or blue tooth system, and (xi) auto shut off system to provide the outlets with greater safety and convenient performance; to setting, adjusting, selecting, changing at least of light, illumination, power on/off, or other functions or effect(s).
4. A Power strip has separated and distance away UBS-unit(s) as discussion 1, the said power strip or USB-unit(s) has at least one USB-port(s) for input or output the DC power.
5. A Power strip has separated and distance away USB-unit(s) as discussion 1, the USB-unit(s) has built-in wire storage arrangement.
6. A Power strip has separated and distance away UBS-unit(s) as discussion 1, The power strip has at least one attachment selected from (i) a heavy weight, (ii) magnetic means, (iii) glue, (iv) double sided foam tape, (v) screws, (vi) a catch-n-hook fastener, (vii) Velcro tape, or (ix) other market-available skills or materials.
7. A Power strip has separated and distance away UBS-unit(s) as discussion 1, the female USB-port(s) built-in power strip or USB-unit(s) configure for male plug selected from (i) Type A (ii) Type C, (iii) Micro USB, (iv) lighting of Apple company, (v) android, (vi) one of market communication or tablet equipment, (vii) USB ports jump or connection wire with have 2 male plug (s).
8. A Power strip has separated and distance away UBS-unit(s) as discussion 1, the main wire is much shorter than branch-wire to save cost and power strip close the home outlet(s) and USB-unit(s) has enough length to arranged or attached or install on more than one location(s) such as desktop, side-bed table, bed frame, bed legs (two sides) so buy one power strips get plurality of location with USB-unit(s).
9. From FIGS. 4PP, 2PP, 23PP, 25PP, 14PP, 29PP, 26PP shown;
An LED lighting device for Desktop or floor installation has separated and distance away UBS-unit(s), comprising;
At least one (a) external transformer through output main wire, (b) external DC power source through USB wire; supply DC power for at least one light device and more than one USB-unit(s) separated and distance away from light device and other USB-unit(s).
At least one LED(s) offer at least one of area or status indicator; illumination.
At least one IC incorporate at least one of circuit or control system to make at least one of (1) Color changing,
(2) color selection,
(3) function selections,
(4) brightness adjusting,
(5) on-off light.
At least one (A) main-wire(s) connected with external transformer, (B) USB wire(s) connect with external DC power source; to deliver pre-determined wattage DC power to more than one of branch-wire(s) to at least one of USB female port(s) built-in desired number(s) of separated and distance away from power strip and other USB-unit(s).
10. From FIG. 4, 4B, 5A, 5B, 5C and FIGS. 4PP, 2PP, 23PP, 25PP, 14PP, 29PP, 26PP shown; An LED lighting device for Desktop or floor installation has separated and distance away UBS-unit(s), comprising;
At least one built-in AC-to-DC circuit change home AC power to DC power to supply power to at least one (i) LED lighting and (ii) at least one USB-unit(s) which are separated and distance away from light device and other USB-unit(s).
At least one LED(s) offer at least one of area or status indicator; illumination.
At least one IC incorporate at least one of circuit or control system to make at least one of
(a) Color changing,
(b) color selection,
(c) function selections,
(d) brightness adjusting,
(e) on-off light.
At least one main-wire(s) connected with device to deliver pre-determined wattage DC power to more than one of branch-wire(s) to at least one of USB female port(s) built-in desired number(s) of USB-unit(s).
11. An LED lighting device for Desktop or floor installation has separated and distance away UBS-unit(s) as discussion 9 and 10, the female USB-port(s) built-in power strip or USB-unit(s) configure for male plug selected from (i) Type A (ii) Type C, (iii) Micro USB, (iv) lighting of Apple company, (v) android, (vi) one of market communication or tablet equipment, (vii) USB ports jump or connection wire with have 2 male plug (s).
12. An LED lighting device for Desktop or floor installation has separated and distance away UBS-unit(s) as discussion 9 and 10, the main-wire is shorter than branch-wire.
13. An LED light device for desktop or floor installation has separated and distance away UBS-unit(s) as discussion 9 and 10, at least one functional or decorative or treatment or finish item, device, products fit into at least one light device or USB-unit(s).
14. An LED light device for desktop or floor installation has separated and distance away UBS-unit(s) as discussion 9 and 10, the said LED light devise is one of (i) reading light, (ii) accent light, (iii) floor light, (iv) lighted mirror, (v) digital alarm clock, (vi) time related products, (vii) project image or patterns light, (viii) Lava or glitter light, (ix) steam, moisture, smell diffusor, (x) essential oil diffusor, (xi) color changing and color selection incorporated IC accent light, (xii) USB wire powered light, (xiii)
15. An LED light device for desktop or floor installation has separated and distance away UBS-unit(s) as discussion 9 and 10, the USB-unit(s) has enough length to arrange install not only light device location but also has plurality number to install on side-bed table, bed frame, bed legs, living room table, couch table, floor light levels, furniture flat areas or use attachment kits to tie or glue or hold on table legs, walls.

16. From FIGS. 1, 2, 3A, 3B. 3C for Plug-in night light shown'

A plug-in LED light has separated and distance away USB-unit(s), comprising.

At least one LED(s) to offer at least one area or status indicator; illumination.

At least one AC-to-DC circuit built-in plug-in nigh light to change home AC power to DC power to supply to LED(s) and at least or more than one separated and distance away USB-unit(s).

Wherein, LED light has at least one of electric parts or accessories selected from (i) circuit, (ii) IC, (iii) sensor(s), (iv) selection switch, (v) dimmer switch, (vi) power fail system, (vii) function selection system, (viii) photo sensor; to make pre-determined light function(s), effects(s), cycle(s), duration(s), color(s), brightness(s).

At least one main-wire(s) connected with plug-in night light to deliver pre-determined wattage DC power to more than one of branch-wire(s) to at least one of USB female port(s) built-in desired number(s) of USB-unit(s).

I claim:

1. A power strip having at least one separate and spaced USB unit, comprising:
   at least one AC outlet fitted within the power strip; and
   at least one AC-to-DC circuit built in the power strip to change AC power input from an AC plug-wire to DC power,
   wherein the DC power is delivered from a power strip circuit output end through at least one wire to at least one USB unit separated and spaced from the power strip,
   wherein the at least one USB unit has a built-in wire storage arrangement.

2. A power strip having at least one separate and spaced USB unit as claimed in claim 1, further comprising at least one functional, decorative, treated, and/or finished item, device, or product that is fitted into the power strip or the at least one USB unit.

3. A power strip having at least one separate and spaced USB unit as claimed in claim 1, wherein the power strip has a plurality of outlets and incorporates at least one component or a system that is or has at least one of:
   (i) surge protection or another protective function;
   (ii) a remote or wireless control system;
   (iii) an LED area or status indicator;
   (iv) a master power outlet for controlling other outlets;
   (v) at least one sensor;
   (vi) a remote controller;
   (vii) a currently leakage warning system;
   (viii) an integrated circuit;
   (ix) a wireless system;
   (x) a WiFi, Z-way, Zigbee, or Bluetooth system; and
   (xi) an auto shut off system,
   to set, adjust, select, or change at least one function or effect for safety or convenience.

4. A power strip having at least one separate and spaced USB unit as claimed in claim 1, wherein the power strip or the at least one USB unit has at least one USB port for inputting or outputting DC power.

5. A power strip having at least one separate and spaced USB unit as claimed in claim 1, wherein a base of the power strip has a built-in wire storage arrangement.

6. A power strip having at least one separate and spaced USB unit as claimed in claim 1, wherein the power strip or the at least one USB unit has at least one attachment selected from (i) a heavy weight, (ii) a magnetic arrangement, (iii) glue, (iv) double-sided foam tape, (v) screws, (vi) a catch-and-hook fastener, (vii) Velcro™, or (ix) at least one hole or opening for hanging.

7. A power strip having at least one separate and spaced USB unit as claimed in claim 1, wherein the power strip or at least one USB unit includes at least one female USB port configured to receive a male plug selected from (i) Type A USB, (ii) Type C USB, (iii) Micro USB, (iv) an Apple Company device compatible plug configuration, (v) an Android™ compatible plug configuration (vi) a mobile device or tablet compatible configuration, (vi) a dual-male-plug jump or connection wire configuration.

8. A power strip having at least one separate and spaced USB unit as claimed in claim 1, wherein, to save cost, the AC plug-wire is shorter than the at least one wire to the at least one USB unit, whereby even though the power strip must be situated close to a home outlet due to the short AC plug-wire, the at least one USB unit may be situated at locations away from the home outlet, including a desktop, bedside table, bed frame, and bed legs due to the greater length of the at least one wire to the at least one USB unit.

* * * * *